(12) United States Patent
Takemoto

(10) Patent No.: US 10,445,693 B2
(45) Date of Patent: Oct. 15, 2019

(54) GOODS MONITORING DEVICE, GOODS MONITORING SYSTEM, AND GOODS MONITORING METHOD

(71) Applicant: PANASONIC INTELLECTUAL PROPERTY MANAGEMENT CO., LTD., Osaka (JP)

(72) Inventor: Yuichiro Takemoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 173 days.

(21) Appl. No.: 15/504,174

(22) PCT Filed: Jul. 16, 2015

(86) PCT No.: PCT/JP2015/003592
§ 371 (c)(1),
(2) Date: Feb. 15, 2017

(87) PCT Pub. No.: WO2016/038774
PCT Pub. Date: Mar. 17, 2016

(65) Prior Publication Data
US 2018/0211205 A1    Jul. 26, 2018

(30) Foreign Application Priority Data
Sep. 11, 2014   (JP) ................................ 2014-185013

(51) Int. Cl.
*G06Q 10/08* (2012.01)
*G06Q 30/06* (2012.01)
(Continued)

(52) U.S. Cl.
CPC ....... *G06Q 10/087* (2013.01); *G06K 9/00771* (2013.01); *G06Q 30/06* (2013.01);
(Continued)

(58) Field of Classification Search
USPC .......................................................... 705/28
See application file for complete search history.

(56) References Cited

U.S. PATENT DOCUMENTS

2017/0017840 A1* 1/2017 Higa .................. G06K 9/00201

FOREIGN PATENT DOCUMENTS

JP      05-081552      4/1993
JP      2002-018087    1/2002
(Continued)

OTHER PUBLICATIONS

U.S. Appl. No. 15/515,747 to Yoshifumi Sakata et al., filed Mar. 30, 2017.
(Continued)

*Primary Examiner* — Garcia Ade
(74) *Attorney, Agent, or Firm* — Greenblum & Bernstein, P.L.C.

(57) ABSTRACT

This device is configured to include a state monitoring area setter that sets a state monitoring area on the image of the display area, an item detector that detects item displayed in the state monitoring area, based on the image of the display area, a display state determinator that determines a display state of item in the state monitoring area, based on a detection result by the item detector, and a display screen generator that generates a monitoring screen including a monitoring image in which a display state displaying image representing the display state of item in the state monitoring area is superimposed on the image of the display area, based on a determination result by the display state determinator.

13 Claims, 20 Drawing Sheets

(51) Int. Cl.
  *G06K 9/00* (2006.01)
  *G06T 11/20* (2006.01)
  *G06T 11/60* (2006.01)
  *G08B 21/24* (2006.01)
  *G06Q 50/28* (2012.01)

(52) U.S. Cl.
  CPC ............ *G06Q 50/28* (2013.01); *G06T 11/206* (2013.01); *G06T 11/60* (2013.01); *G08B 21/24* (2013.01); *G06T 2200/24* (2013.01)

(56) References Cited

FOREIGN PATENT DOCUMENTS

| | | |
|---|---|---|
| JP | 2002-366621 | 12/2002 |
| JP | 2003-009142 | 1/2003 |
| JP | 3908047 | 1/2007 |
| JP | 5881022 B1 | 3/2016 |

OTHER PUBLICATIONS

International Search Report (ISR) in International Pat. Appl. No. PCT/JP2015/003592, dated Oct. 13, 2015.

* cited by examiner

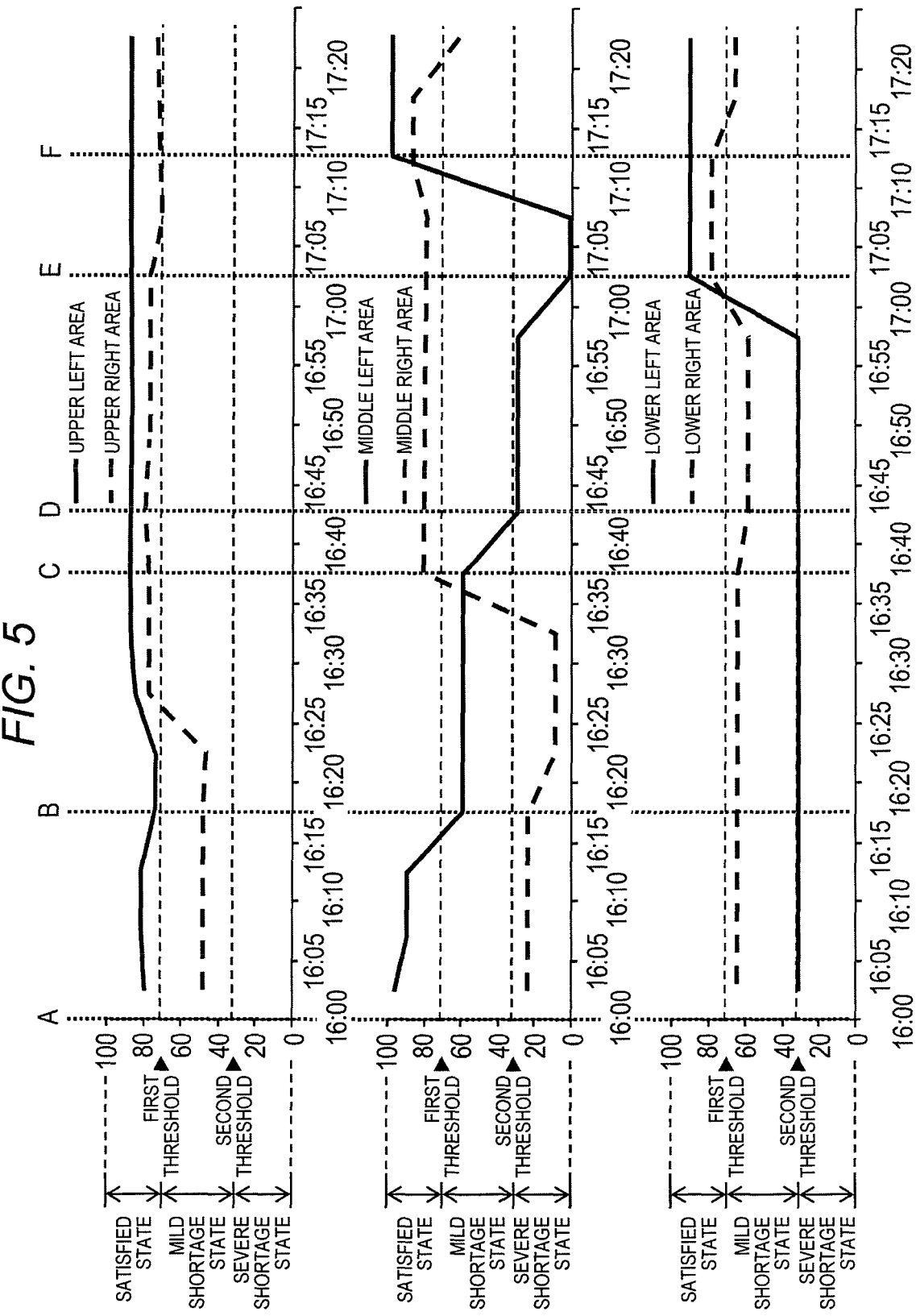

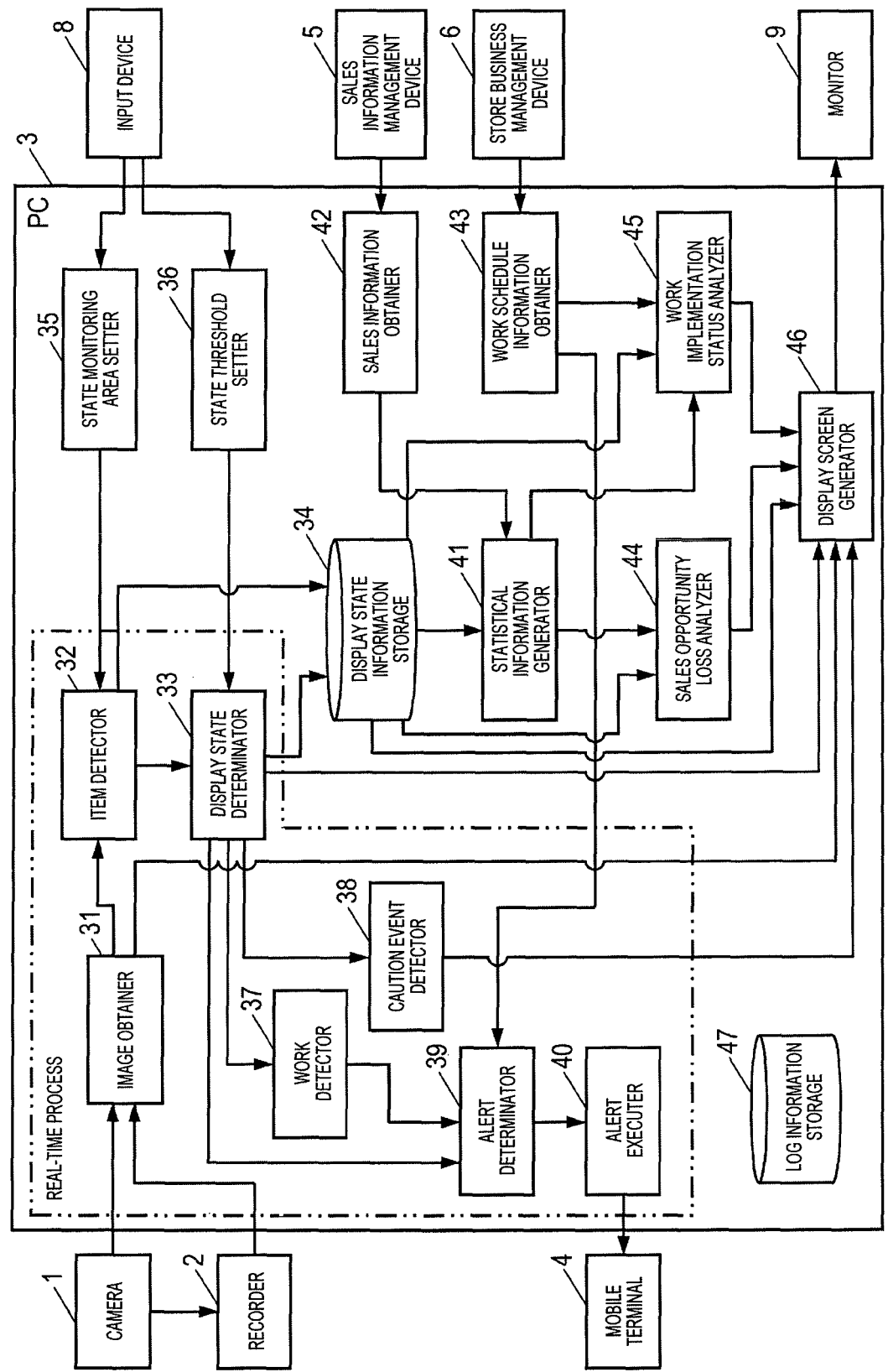

FIG. 11A
NORMAL TIME
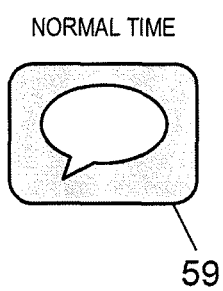
59
FIG. 11B
SHORTAGE OCCURS IN FF
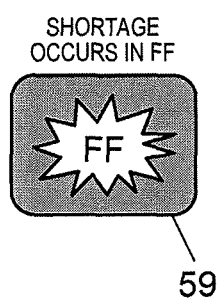
59
FIG. 11C
SHORTAGE STATE CONTINUES
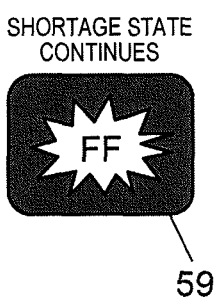
59
FIG. 12
| | |
|---|---|
| Q | FAST FOOD CASE |
| | |
|---|---|
| FF CASE<br>FRIED CHICKEN | 9:00 AM 2013/10/30<br>SEVERE SHORTAGE STATE CONTINUES |
| FF CASE<br>FRIED CHICKEN | 8:30 AM 2013/10/30<br>SEVERE SHORTAGE STATE OCCURS |
| FF CASE<br>DEEP FRIED CHICKEN | 7:00 AM 2013/10/30<br>RETURN TO SATISFIED STATE |
[ALL] [More]

GOODS MONITORING DEVICE, GOODS MONITORING SYSTEM, AND GOODS MONITORING METHOD

TECHNICAL FIELD

The present invention relates to an item monitoring device, an item monitoring system, and an item monitoring method, which monitor a display state of item based on a captured image of a display area in a store.

BACKGROUND ART

In stores such as convenience stores, a sales opportunity loss occurs if there is a defect in the display state of item displayed on display shelves, that is, the display of item is disturbed or there is a shortage of item, and this sales opportunity loss gives a big influence on the sales of the store, such that in a case where there is a defect in the display state of item, it is necessary to promptly implement an item management work (an arranging work or a replenishing work) to resolve the defect.

As a technique relating to such item management work, in the related art, a technique is known which determines necessity of replenishment of item based on the captured image of a display area and makes a notification instructing a replenishing work (see PTL 1). Further, a technique is known which generates information on a display method of item or a lack of item based on a captured image of a display area and transmitting the information to the terminal in a head office (see PTL 2). Further, a technique is known which determines necessity of arranging item based on the captured image of a display area and makes a notification instructing an arranging work (see PTL 3).

CITATION LIST

Patent Literature

PTL 1: Japanese Patent Unexamined Publication No. 5-081552
PTL 2: Japanese Patent Unexamined Publication No. 2002-366621
PTL 3: Japanese Patent No. 3908047

SUMMARY OF THE INVENTION

The above-described technique in the related art enables monitoring the display status of item in the display area and instructing the store staff member to perform an item management work (an arranging work or a replenishing work) as necessary. However, there are problems that the store staff member may not necessarily perform quickly and appropriately the item management work in response to the instruction, and a user such as a store manager cannot check the implementation status of the item management work by the store staff member, that is, whether or not the store staff member has quickly and appropriately performed the item management work. Further, there is a problem that in a case where an item management work is delayed, the user cannot recognize the delay situation.

The present invention has been made to solve such problems in the related art. The main object is to provide an item monitoring device, an item monitoring system, and an item monitoring method, which are configured to allow a store staff member to easily check the implementation status of the item management work such as arrangement or replenishment of item, that is, whether or not the store staff member has quickly and appropriately performed the item management work, and in a case where the item management work is delayed, to easily recognize the delay situation.

An item monitoring device of the present invention is an item monitoring device which monitors a display status of item based on a captured image of a display area in a store. This device includes a state monitoring area setter, an item detector, a display state determinator, and a display screen generator. The state monitoring area setter sets the state monitoring area on the image of the display area. The item detector detects the item displayed in the state monitoring area, based on the image of the display area. The display state determinator determines a display state of item in the state monitoring area, based on a detection result by the item detector. The display screen generator generates a monitoring screen including a monitoring image in which a display state displaying image representing the display state of item in the state monitoring area is superimposed on the image of the display area, based on a determination result by the display state determinator.

An item monitoring system of the present invention is an item monitoring system which monitors a display status of item based on a captured image of a display area in a store, and includes a camera that captures images of the display area, and a plurality of information processing devices. Any one of the plurality of information processing devices includes a state monitoring area setter, an item detector, a display state determinator, and a display screen generator. The state monitoring area setter sets the state monitoring area on the image of the display area. The item detector detects the item displayed in the state monitoring area, based on the image of the display area. The display state determinator determines a display state of item in the state monitoring area, based on a detection result by the item detector. The display screen generator generates a monitoring screen including a monitoring image in which a display state displaying image representing the display state of item in the state monitoring area is superimposed on the image of the display area, based on a determination result by the display state determinator.

An item monitoring method of the present invention is an item monitoring method causing an information processing device to implement a process of monitoring a display status of item based on a captured image of a display area in a store. This method is configured to include a step of setting a state monitoring area on the image of the display area, a step of detecting item displayed in the state monitoring area, based on the image of the display area, a step of determining a display state of item in the state monitoring area, based on a detection result in the detection step, and a step of generating a monitoring screen including a monitoring image in which a display state displaying image representing the display state of item in the state monitoring area is superimposed on the image of the display area, based on a determination result in the determination step.

According to the present invention, the user can immediately recognize the display state of item, based on the display state displaying image in the monitoring image. Further, the user can check the actual status of item, based on the image of the display area in the monitoring image. In this way, it is possible to easily check the implementation status of the item management work by the store staff member, that is, whether or not the store staff member has quickly and appropriately performed the item management work.

BRIEF DESCRIPTION OF DRAWINGS

FIG. 5 is an explanatory diagram illustrating a time chart illustrating temporal transition of a display state.

FIG. 6 is a functional block diagram illustrating a schematic configuration of PC 3.

FIG. 11A is an explanatory diagram illustrating a change state of warning icon 59 displayed on the monitoring screen.

FIG. 11B is an explanatory diagram illustrating a change state of warning icon 59 displayed on the monitoring screen.

FIG. 11C is an explanatory diagram illustrating a change state of warning icon 59 displayed on the monitoring screen.

FIG. 12 is an explanatory diagram illustrating a message box displayed on monitor 9.

DESCRIPTION OF EMBODIMENTS

Figure 1:
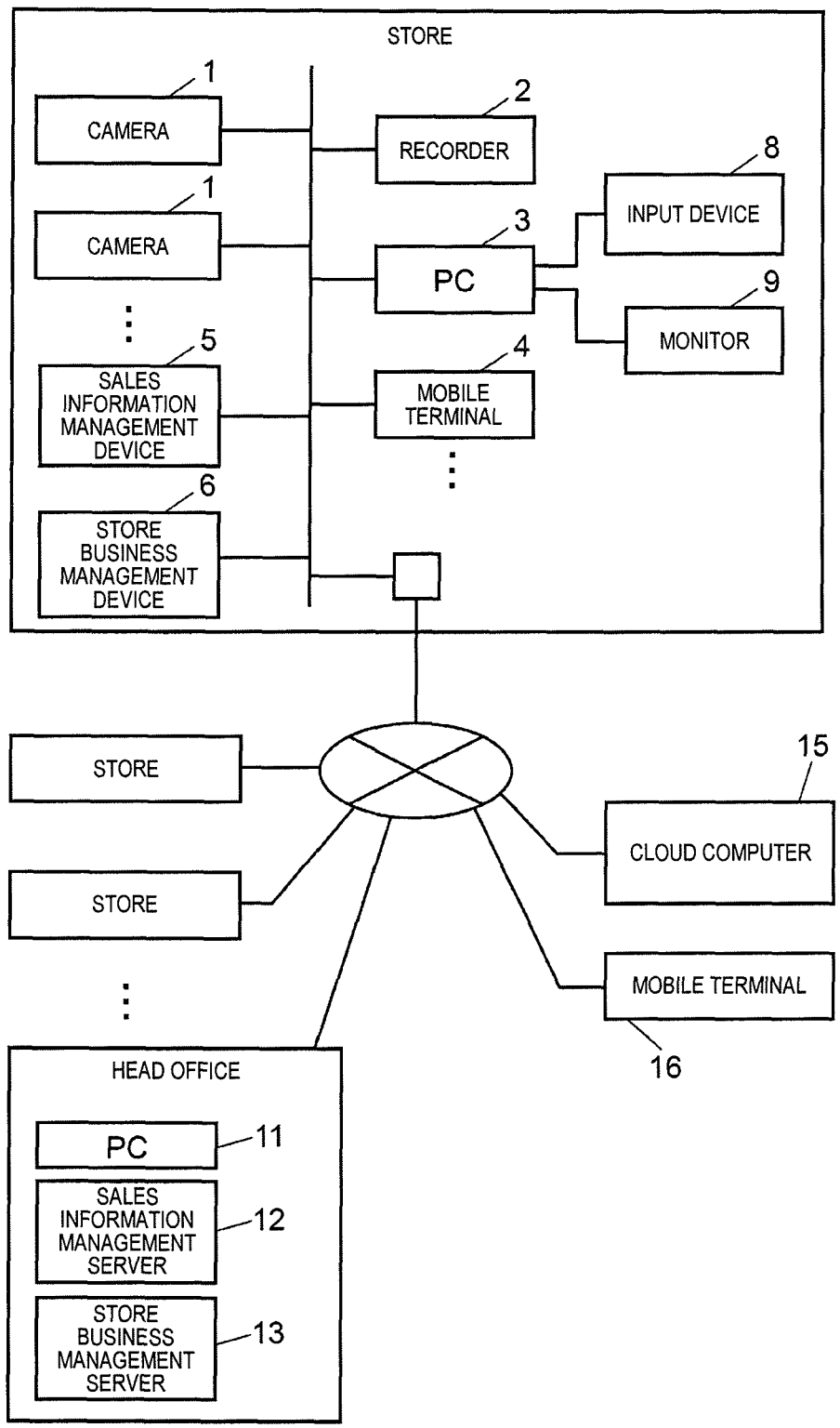
FIG. 1 is an overall configuration diagram of an item monitoring system according to a present exemplary embodiment.

A first aspect of the present invention is an item monitoring device which monitors a display status of item based on a captured image of a display area in a store. This device includes a state monitoring area setter, an item detector, a display state determinator, and a display screen generator. The state monitoring area setter sets the state monitoring area on the image of the display area. The item detector detects the item displayed in the state monitoring area, based on the image of the display area. The display state determinator determines a display state of item in the state monitoring area, based on a detection result by the item detector. The display screen generator generates a monitoring screen including a monitoring image in which a display state displaying image representing the display state of item in the state monitoring area is superimposed on the image of the display area, based on a determination result by the display state determinator.

According to this, the user can immediately recognize the display state of item, based on the display state displaying image in the monitoring image. Further, the user can check the actual status of item, based on the image of the display area in the monitoring image. In this way, it is possible to easily check the implementation status of the item management work by the store staff member, that is, whether or not the store staff member has quickly and appropriately performed the item management work.

A second aspect of the present invention is configured such that the display screen generator changes a display color of the display state displaying image depending on the display state.

According to this, the user can immediately recognize the display state of item, based on the display color of the display state displaying image.

A third aspect of the present invention is configured such that the display state displaying image is a frame image representing the state monitoring area set on the image of the display area.

According to this, the user can immediately recognize the display state of item and the range of the state monitoring area at the same time, based on the display state displaying image.

A fourth aspect of the present invention is configured to include a display state information storage that stores the detection result by the item detector and the determination result by the display state determinator, as display state information, the display screen generator generates a time chart illustrating temporal transition of the display state of item, based on the display state information, and displays the time chart and the monitoring image on the monitoring screen.

According to this, the user can recognize the display state of item in detail based on the monitoring image, and the temporal transition of the display state of item, based on the time chart, at the same time.

A fifth aspect of the present invention further includes an alert determinator that determines propriety of a notification instructing a store staff member to perform an item management work, based on a determination result by the display state determinator, and an alert executer that performs the notification, based on the determination result by the alert determinator. The display state determinator makes a determination on at least one of the display disturbance state and the display shortage state, as the display state. The alert executer makes a notification instructing a store staff member to perform at least any one of an arranging work to resolve a disturbance in display and a replenishing work to resolve the shortage of item, as an item management work.

According to this, in a case where there is a defect in the display of item, an appropriate notification can be made according to the contents of the deficiency. Then, the store staff member executes an appropriate item management work according to the contents of the notification, thereby removing the defect in the display of item swiftly.

In a sixth aspect of the present invention, the display screen generator is configured to display a character representing the display state of item, on the monitoring screen, in a state corresponding to the state monitoring area of the monitoring image, based on a determination result by the display state determinator.

According to this, the user can immediately recognize the display state of item for each state monitoring area, based on the characters representing the display state of item.

A seventh aspect of the present invention is configured to further include a caution event detector that detects a caution event which needs to urge caution to the user regarding the display state of item, based on the determination result by the display state determinator, in which the display screen generator displays a message display portion indicating the contents of the caution event, based on the detection result by the caution event detector.

According to this, the user can recognize the situation of a caution event which needs to urge caution to the user regarding the display state, for example, an event in which there is a change in a display state or an event in which a defect state of the display of item continues for a long time, based on the message box.

An eighth invention further includes a display state information storage, a sales information obtainer, a statistical information generator, and a sales opportunity loss analyzer. The display state information storage stores the detection result by the item detector and the determination result by the display state determinator, as display state information. The sales information obtainer acquires sales information on the sales situation of item in the store. The statistical information generator performs a statistical process on the sales information with time to generate statistical information on the sales situation of item. The sales opportunity loss analyzer acquires a caution point at which a sales opportunity loss is supposed to occur, based on the statistical information. The display screen generator generates a time chart illustrating temporal transition of the display state and sales situation of item, based on the display state information and the statistical information, and displays an image representing the caution point by superimposing the image on the time chart.

According to this, the user can recognize a timing at which the sales opportunity loss is supposed to occur based on the image representing the caution point.

A ninth aspect of the present invention further includes a display state information storage that stores the detection result by the item detector and the determination result by the display state determinator as display state information, and a work schedule information obtainer that acquires work schedule information on a work schedule specifying a timing to be implemented of an item management work. The display screen generator generates a time chart illustrating temporal transition of the display state of item, based on the display state information, and displays the image representing a timing to be implemented by superimposing the image on the time chart.

According to this, the user can recognize the timing at which the item management work is supposed to be executed based on the time chart, and the user compares this timing with a timing to be implemented and can easily recognize the delay status of the item management work.

Further, a tenth aspect of the present invention further includes a display state information storage, a work schedule information obtainer, and a work implementation status analyzer. The display state information storage stores the detection result by the item detector and the determination result by the display state determinator, as display state information. The work schedule information obtainer acquires work schedule information on a work schedule specifying a timing to be implemented of an item management work. Work implementation status analyzer acquires a required delay period up to the timing at which the item management work is supposed to be executed, from a timing to be implemented of the item management work, based on the display state information and the work schedule information. The display screen generator generates a time chart illustrating temporal transition of the display state of item, based on the display state information, and displays the image representing a delay period by superimposing the image on the time chart.

According to this, the user can easily recognize the delay situation of the item management work, based on the image representing a delay period.

An eleventh invention is an item monitoring system which monitors a display status of item, based on a captured image of a display area in a store, and includes a camera that captures images of the display area, and a plurality of information processing devices. Any one of the plurality of information processing devices includes a state monitoring area setter, an item detector, a display state determinator, and a display screen generator. The state monitoring area setter sets the state monitoring area on the image of the display area. The item detector detects the item displayed in the state monitoring area, based on the image of the display area. The display state determinator determines a display state of item in the state monitoring area, based on a detection result by the item detector. The display screen generator generates a monitoring screen including a monitoring image in which a display state displaying image representing the display state of item in the state monitoring area is superimposed on the image of the display area, based on a determination result by the display state determinator.

According to this, similar to the first aspect of the present invention, it is possible to easily check the implementation status of the item management work by the store staff member, that is, whether or not the store staff member has quickly and appropriately performed the item management work.

A twelfth invention is an item monitoring method causing an information processing device to implement a process of monitoring a display status of item based on a captured image of a display area in a store. This method is configured to include a step of setting a state monitoring area on the image of the display area, a step of detecting item displayed in the state monitoring area, based on the image of the display area, a step of determining a display state of item in the state monitoring area, based on a detection result in this step, and a step of generating a monitoring screen including a monitoring image in which a display state displaying image representing the display state of item in the state monitoring area is superimposed on the image of the display area, based on a determination result in this step.

According to this, similar to the first aspect of the present invention, it is possible to easily check the implementation status of the item management work by the store staff member, that is, whether or not the store staff member has quickly and appropriately performed the item management work.

Hereinafter, exemplary embodiments of the present invention will be described with reference to the drawings.

FIG. 1 is an overall configuration diagram of an item monitoring system according to the present exemplary embodiment. This item monitoring system is constructed for a retail chain store such as a convenience store, and includes camera 1, recorder (image storage device) 2, PC (item monitoring device) 3, mobile terminal 4, sales information management device 5, and store business management device 6.

Cameras 1 are installed at appropriate locations in a store to capture an interior of the store, and images obtained thereby are recorded by recorder 2.

The PC 3 is connected with input device 8 such as a mouse by which a user such as a store manager performs various input operations, and monitor (display device) 9 displaying a monitoring screen. The monitoring screen displayed on monitor 9 enables the user to have a real-time view of the images of the interior of the store captured by camera 1 as well as to view the past images of the interior of the store recorded in recorder 2.

Further, camera 1, recorder 2, and PC 3 are installed in each of a plurality of stores, and PC 11 is installed in the head office which handles the plurality of stores.

It is possible to view the images of the interior of the store captured by camera 1 in real time and view the past images of the interior of the store recorded in recorder 2 on PC 11, and this allows a user at the head office to check the situation in the store.

In the present exemplary embodiment, PC 3 installed in the store is configured as an item monitoring device that monitors the state of people and item in the store, and the user on the store side, for example, the store manager can view the monitoring information generated by PC 3, on PC 3. Further, this monitoring information is transmitted to PC 11 installed in the head office, the user on the head office side, for example, a supervisor who provides guidance and suggestions to each store in the area in charge can view the information even on PC 11, and PCs 3, 11 are configured as a display device for displaying the monitoring information.

Mobile terminal 4 is possessed by a store staff member or a store manager, and various types of notification are provided to the store staff member or the store manager from PC 3 by using mobile terminal 4.

Sales information management device (POS terminal) 5 installed in the store and sales information management server (POS server) 12 installed in the head office constitute a POINT OF SALE (POS) system (sales information management system) which manages sales information on sales at each store. In this POS system, information such as the name, type, quantity, amount of money, and accounting time of item purchased by the customer is managed as sales information. This sales information is shared between sales information management device 5 and sales information management server 12, sales information management device 5 manages sales information of the store in which this device is installed, and sales information management server 12 manages sales information of all stores.

Store business management device 6 and store business management server 13 installed in the head office constitutes a store business management system which manages the business in each store. This store business management system manages information on a work schedule or the like concerning various works performed by the store staff member, as business management information. This business management information is shared between store business management device 6 and store business management server 13, store business management device 6 manages the business management information on the store in which this device is installed, and store business management server 13 manages business management information on all stores.

Figure 2:
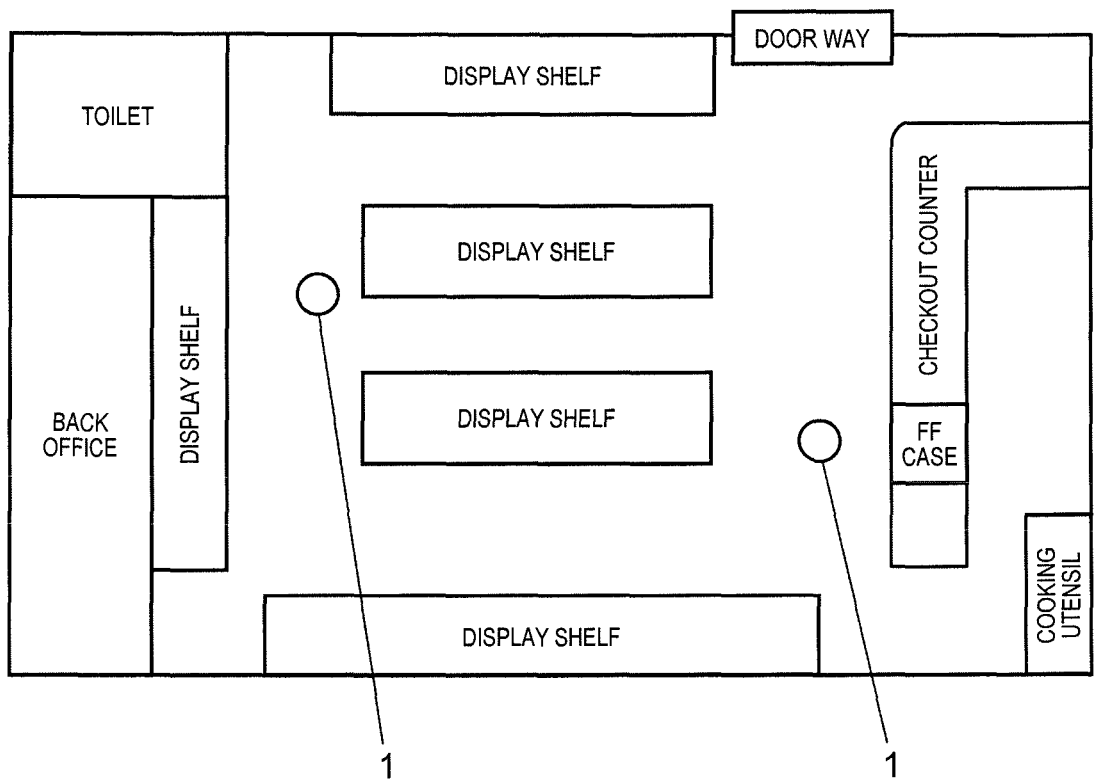
FIG. 2 is a plan view of a store illustrating a layout of the store and an installation state of camera 1.

Next, a layout of a store and an installation state of cameras 1 will be described. FIG. 2 is a plan view of a store illustrating a layout of a store and an installation state of camera 1.

The store includes a doorway, display shelves, checkout counters, cooking utensils, and the like. The display shelves are set up for respective types of item, such as fast food, rice (item such as rice balls, lunch boxes, and sushi), processed foods, miscellaneous item, fresh foods, magazines, newspapers and the like. Cooking utensils are used to cook fast food such as fried chicken in the store, and display shelves for fast food (FF case) are arranged next to the checkout counter. A customer enters the store through the doorway, moves in the store through passages between the display shelves, and when a desired good is found, goes to the checkout counter with the good, and makes payment (pays for the good) at the checkout counter before exiting the store through the doorway.

In addition, a plurality of cameras 1 which capture images of the interior of the store (monitoring areas) are installed in the store. Cameras 1 are installed at appropriate positions on the ceiling in the store. In particular, in the example illustrated in FIG. 2, an omnidirectional camera having a photographing range of 360 degrees using a fisheye lens is used as camera 1, and item displayed on the display shelves or the like, people entering and exiting the store from the doorway, people staying in the store, and the like can be captured by camera 1.

Figure 3:
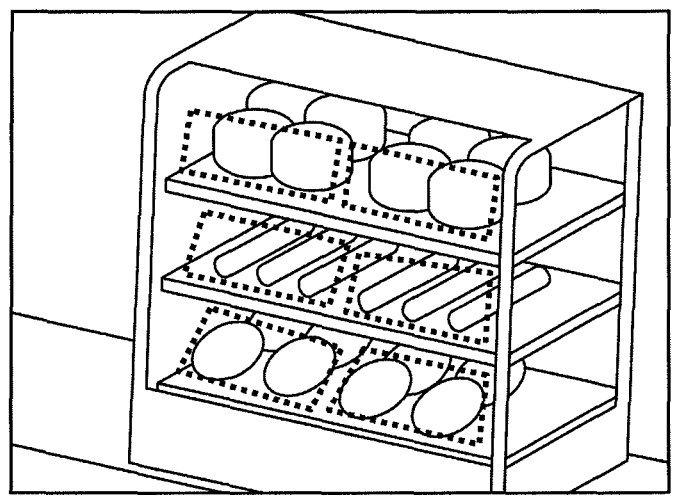
FIG. 3 is an explanatory diagram illustrating a state monitoring area which is set on an image of a display area.
Figure 4A:
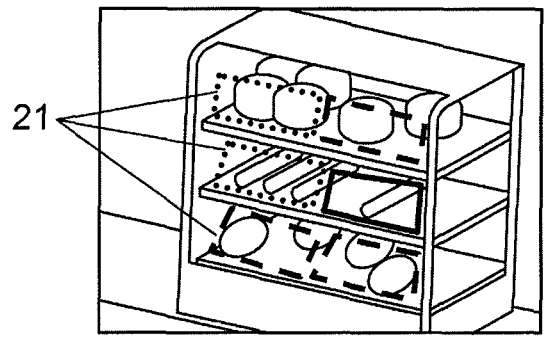
FIG. 4A is an explanatory diagram illustrating a monitoring image that displays a display state of a display area.
Figure 4B:
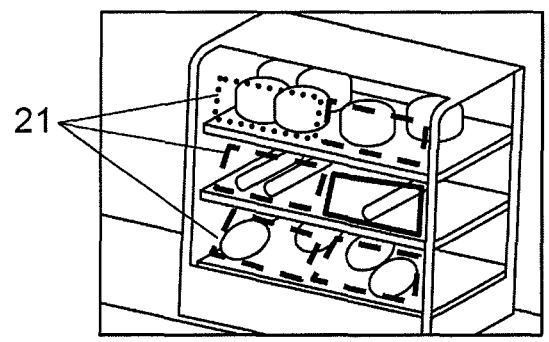
FIG. 4B is an explanatory diagram illustrating a monitoring image that displays a display state of the display area.
Figure 4C:
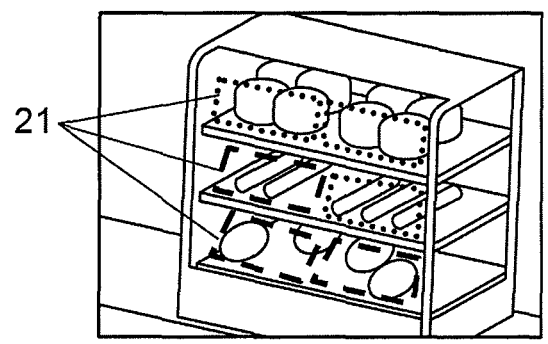
FIG. 4C is an explanatory diagram illustrating a monitoring image that displays a display state of the display area.
Figure 4D:
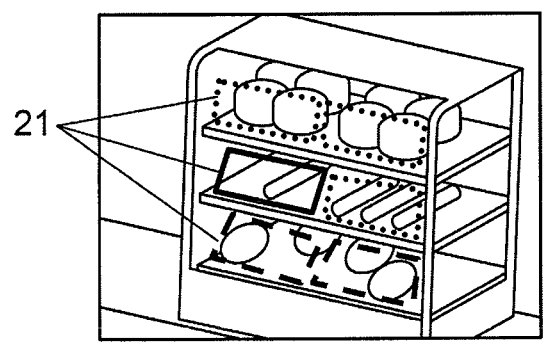
FIG. 4D is an explanatory diagram illustrating a monitoring image that displays a display state of the display area.
Figure 4E:
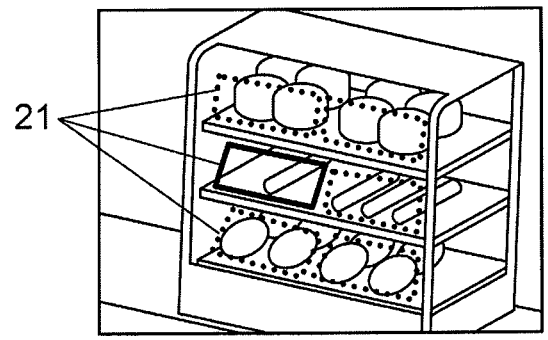
FIG. 4E is an explanatory diagram illustrating a monitoring image that displays a display state of the display area.
Figure 4F:
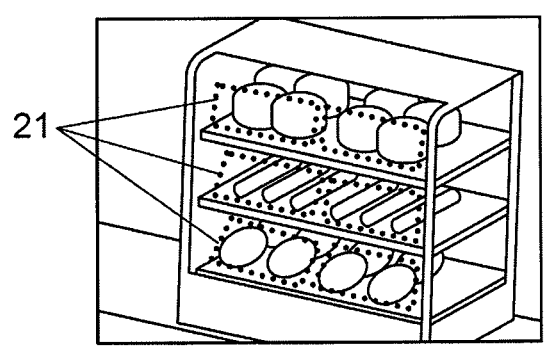
FIG. 4F is an explanatory diagram illustrating a monitoring image that displays a display state of the display area.

Next, the outline of a process performed in PC 3 illustrated in FIG. 1 will be described. FIG. 3 is an explanatory diagram illustrating a state monitoring area which is set on an image of a display area. FIG. 4A to 4F are explanatory diagrams each illustrating a monitoring image that displays a display state of the display area. FIG. 5 is an explanatory diagram illustrating a time chart illustrating temporal transition of a display state.

In the present exemplary embodiment, as illustrated in FIG. 3, state monitoring areas are set in areas in which item are disposed, in an image of a display area (a display shelf, or the like), and the display state of each of the item is determined for each state monitoring area. In the example illustrated in FIG. 3, a fast food display shelf (FF case) is set as the display area, and a total of six state monitoring areas which are upper left and right areas, middle left and right areas, and lower left and right areas are set for this display shelf.

In the present exemplary embodiment, as illustrated in FIGS. 4A to 4F, the display state of item in each state monitoring area is expressed by changing the display color of frame image (display state displaying image) 21 representing the state monitoring area set on the image of the display area depending on the display state. In particular, in the present exemplary embodiment, three states of a satisfied state, a mild shortage state and a severe shortage state are determined as the display state, and frame image 21 is displayed with three display colors (for example, green, yellow and red). Frame image 21, which is color-coded according to the display state in this manner, is displayed on monitor 9 by being superimposed on the image of the display area. When viewing this image, the user can promptly recognize the display state of item in each state monitoring area.

In the present exemplary embodiment, the display state is represented by a numerical value, and the numerical value representing the display state is compared with a predetermined threshold to determine the display state. In particular, in the present exemplary embodiment, an item occupancy rate, which is the proportion of item in the image of the display area, is used as the numerical value representing the display state. Specifically, a pixel of an object assumed to be item is detected from the image of the state monitoring area cut out from the image of the display area, and the proportion of the pixel of the object assumed to be item to all the pixels may be set as an item occupancy rate. Further, for example, an image captured in a state where item are not displayed is used as a background, and the pixel of the object assumed to be item may be detected based on the difference from the background.

In the present exemplary embodiment, three states of the satisfied state, the mild shortage state and the severe shortage state are determined by using two thresholds of the first and second thresholds. In other words, a case having a value being equal to or larger than the first threshold is determined as the satisfied state, a case having a value being less than the first threshold and being equal to or larger than the second threshold is determined as the mild shortage state, and a case having a value being less than the second threshold is determined as the severe shortage state.

In the present exemplary embodiment, the item detection result in each state monitoring area, that is, the item occupancy rate for each state monitoring area is stored as display state information, and a time chart illustrating temporal transition of the display state of item is generated based on the display state information, as illustrated in FIG. 5 and is displayed on monitor 9. When viewing this time chart, the user can easily recognize the temporal transition state of the display state, in particular, the timing at which a large change occurs in the display state.

In the examples illustrated in FIG. 4A to FIG. 4F, and FIG. 5, time charts are illustrated from 16 o'clock (A timing). At B timing, item are taken out from the middle left state monitoring area immediately before, and the display color of frame image 21 changes from green to yellow. At C timing, item are replenished in the middle right state monitoring area immediately before, and the display color of frame image 21 changes from red to green. At D timing, item are taken out in the middle left state monitoring area immediately before, and the display color of frame image 21 changes from yellow to red. At E timing, item are moved and replenished in the lower left and right state monitoring areas immediately before, and the display color of frame image 21 changes from yellow to green. At F timing, item are replenished in the middle left state monitoring area immediately before, and the display color of frame image 21 changes from red to green. In this way, when viewing the monitoring image, the user can recognize the timing of the item management work such as picking up and replenishment of item.

In the example illustrated in FIG. 5, first and second thresholds are respectively set to 70% and 30%, but the first and second thresholds are not limited thereto, and for example, the first and second thresholds may appropriately be set according to the display format of item or the like, such as 50% and 20%, respectively.

Next, a process performed by PC 3 illustrated in FIG. 1 will be described. FIG. 6 is a functional block diagram illustrating a schematic configuration of PC 3.

PC 3 includes image obtainer 31, item detector 32, display state determinator 33, display state information storage 34, state monitoring area setter 35, state threshold setter 36, work detector 37, caution event detector 38, alert determinator 39, alert executer 40, statistical information generator 41, sales information obtainer 42, work schedule information obtainer 43, sales opportunity loss analyzer 44, work implementation status analyzer 45, display screen generator 46, and log information storage 47.

In image obtainer 31, an image of the interior of the store captured by camera 1 is acquired from camera 1 or recorder 2. Here, images are acquired from camera 1 in the case of displaying current images in real time, and an image is acquired from recorder 2 in the case of displaying the past images.

Item detector 32 executes a process for detecting item displayed in each state monitoring area, based on the image of the display area acquired by image obtainer 31. In the present exemplary embodiment, an item occupancy rate in each state monitoring area, that is, the proportion occupied by the pixels of the object assumed to be item in the image of the display area is obtained as item detection information.

Display state determinator 33 executes a process of determining a display state of item in each state monitoring area, based on the detection result by item detector 32. In this process, the determination is made by comparing the item occupancy rate acquired by item detector 32 in a display shortage state in which the number of item displayed in the display area is insufficient, with a predetermined threshold. In the present exemplary embodiment, as described above, two thresholds of the first and second thresholds are used to determine three states: a satisfied state, a mild shortage state, and a severe shortage state. The determination result by display state determinator 33 is stored in display state information storage 34 as display state information.

Display state determinator 33 determines a display disturbance state in which there is a disturbance in the arrangement of the item displayed in the display area. This determination can be made based on the item occupancy rate acquired by item detector 32. For example, even in a case where the item occupancy rate of each state monitoring area does not exceed a threshold, a case where the variation among the values of the item occupancy rates is large (that is, the degree of change in the display state of item, specifically, the amount of change in the item occupancy rate exceeds an allowable change amount) can be determined as a display disturbance state.

Caution event detector 38 executes a process for detecting a caution event which needs to urge caution to the user regarding the display state of item, based on the determination result by display state determinator 33. In the present exemplary embodiment, an event in which there is a change in the display state, specifically, an event in which there is a defect in the display state of item, that is, a display disturbance state or a display shortage state (a mild shortage state and a severe shortage state), or an event in which a state returns to a state without a defect in the display of item from a state with a defect in the display of item is detected as a caution event. An event in which a defect state of the display of item continues for a long time is detected as a caution event. In this case, the duration of the defect state of the display of item may be compared with a predetermined threshold.

Work detector 37 executes a process of detecting whether or not the item management work has been performed, based on the change state of the display state of item acquired by display state determinator 33. In this processing, in a case where a change in the display state assumed in a case where the item management work is performed appears, it is determined that the item management work has been performed.

Alert determinator 39 executes a process of determining propriety of a notification instructing a store staff member to perform an item management work, based on the determination result by display state determinator 33. In the present exemplary embodiment, display state determinator 33 determines whether a display state is a display disturbance state or a display shortage state.

In a case of a display disturbance state (arrangement-required state), alert determinator 39 determines to make a notification instructing a store staff member to perform an item arranging work to resolve the disturbance.

In a case of a display shortage state (replenishment-required state), alert determinator 39 determines to make a notification instructing a store staff member to perform an item replenishing work to resolve the shortage.

Alert executer 40 makes a notification instructing a store staff member to perform a necessary item management work, that is, any one of an item arranging work to resolve a disturbance in display and an item replenishing work to resolve the shortage of item, based on the determination result by alert determinator 39.

In this notification, a message may be displayed on a screen of mobile terminal (a tablet terminal or a smart phone) 4 carried by the store staff member or the store manager, but a message may be displayed on a screen of sales information management device (POS terminal) 5 installed in the checkout counter. A display panel installed near the ceiling of the store, or a suitable output device such as a lamp or a speaker may be used.

Sales information obtainer 42 executes a process of acquiring sales information on the sales situation of item in the store. In the present exemplary embodiment, sales information is acquired from sales information management device 5. In the present exemplary embodiment, as will be described in detail later, since sales volume of item is obtained for each state monitoring area, it is assumed that the sales information acquired from sales information management device 5 can be aggregated for each state monitoring area.

Work schedule information obtainer 43 executes a process of acquiring work schedule information on a work schedule specifying a timing to be implemented of an item management work. In the present exemplary embodiment, work schedule information is acquired from store business management device 6. In the store, an exhibition work of displaying the item on the display shelf from the back office, a disposal work of removing expired item from the display shelf, a preparing work of cooking the fast food or the like, a work of cleaning the store, or the like are periodically performed in accordance with a preset work schedule, as the item management work.

Statistical information generator 41 acquires display state information from display state information storage 34 and executes a process of generating statistical information on the display state of item for each state monitoring area by executing a statistical process on the display state information with time. Further, sales information sales information management device 5 is acquired through sales information obtainer 42 and a process of generating statistical information on the sales situation of item for each state monitoring area is executed by executing a statistical process on the sales information with time. Since sales information management device 5 executes a necessary statistical process, there is also a case where PC 3 needs not to execute a statistical process on the sales information.

Sales opportunity loss analyzer 44 executes a process of acquiring a caution point at which a sales opportunity loss is supposed to occur, based on the statistical information on the display state and sales situation of item, which is generated by statistical information generator 41, and the display state information on a designated date acquired from display state information storage 34.

Work implementation status analyzer 45 executes a process of acquiring a required delay period (left-over period) up to a timing at which the item management work is supposed to be executed from a timing to be implemented of the item management work, based on the display state information stored in display state information storage 34, the statistical information generated by statistical information generator 41, and the work schedule information acquired from work schedule information obtainer 43.

State monitoring area setter 35 executes a process of setting a state monitoring area (see FIG. 3) on the image of the display area, in response to a user's input operation performed using input device 8. At this time, an area setting screen displaying the layout of the store may be displayed on monitor 9 and the position of the state monitoring area may be input on this area setting screen.

State threshold setter 36 executes a process of setting a threshold used when display state determinator 33 determines a display state (a satisfied state, a mild shortage state, or a severe shortage state), in response to a user's input operation performed using input device 8.

Display screen generator 46 executes a process of generating a monitoring screen for the user to monitor the display status of item in the display area, and displays the monitoring screen on monitor 9. In particular, display screen generator 46 executes a process of displaying a monitoring image in which frame image 21 (see FIG. 4A to FIG. 4F) representing the outline of the state monitoring area is color-coded according to the display state and superimposed on the image of the display area, on a monitoring screen, as a display state displaying image representing the display state of item in each state monitoring area, based on the determination result by display state determinator 33.

Display screen generator 46 executes a process of generating a time chart illustrating temporal transition of the display state of item, based on the display state information stored in display state information storage 34, and integrating and displaying the time chart and the monitoring image on the monitoring screen.

Display screen generator 46 executes a process of generating a time chart illustrating the transition of the display state and the sales situation for each unit time, as the image representing the statistical information, based on the statistical information generated by statistical information generator 41, and superimposing and displaying an image representing the caution point acquired by sales opportunity loss analyzer 44 on the time chart. Display screen generator 46 executes a process of displaying the image representing a delay period acquired from work implementation status analyzer 45 by superimposing the image on the time chart.

Log information storage 47 stores, for example, the type of the item management work detected by work detector 37, the state monitoring area in which the item management work is performed, the execution time of the item management work, and the like, as log information, from a result of processing performed in each unit of PC 3. The log information stored in log information storage 47 is output, for example, as a daily report, so that the user (store manager or supervisor) can recognize the working situation of a single day.

When it is detected that the item management work is executed, work detector 37 may acquire the quantity of item taken out and put in the state monitoring area, based on the degree of change in the display state of item, specifically, the change amount of the item occupancy rate, and store it in log information storage 47.

Each unit of PC 3 illustrated in FIG. 6 is realized by the CPU of PC 3 executing an application program for item monitoring. This program can be installed in PC 3 which is an information processing device in advance and configured as a dedicated device, or may be provided to the user by being recorded in an appropriate program recording medium or through a network, as an application program operating on a general purpose OS.

Each of item detector 32, display state determinator 33, work detector 37, caution event detector 38, alert determinator 39, and alert executer 40 executes a required process at a predetermined timing in real time, and the processing results (the item occupancy rate, the display state, and the like) are output from each unit at predetermined time intervals.

Figure 7:
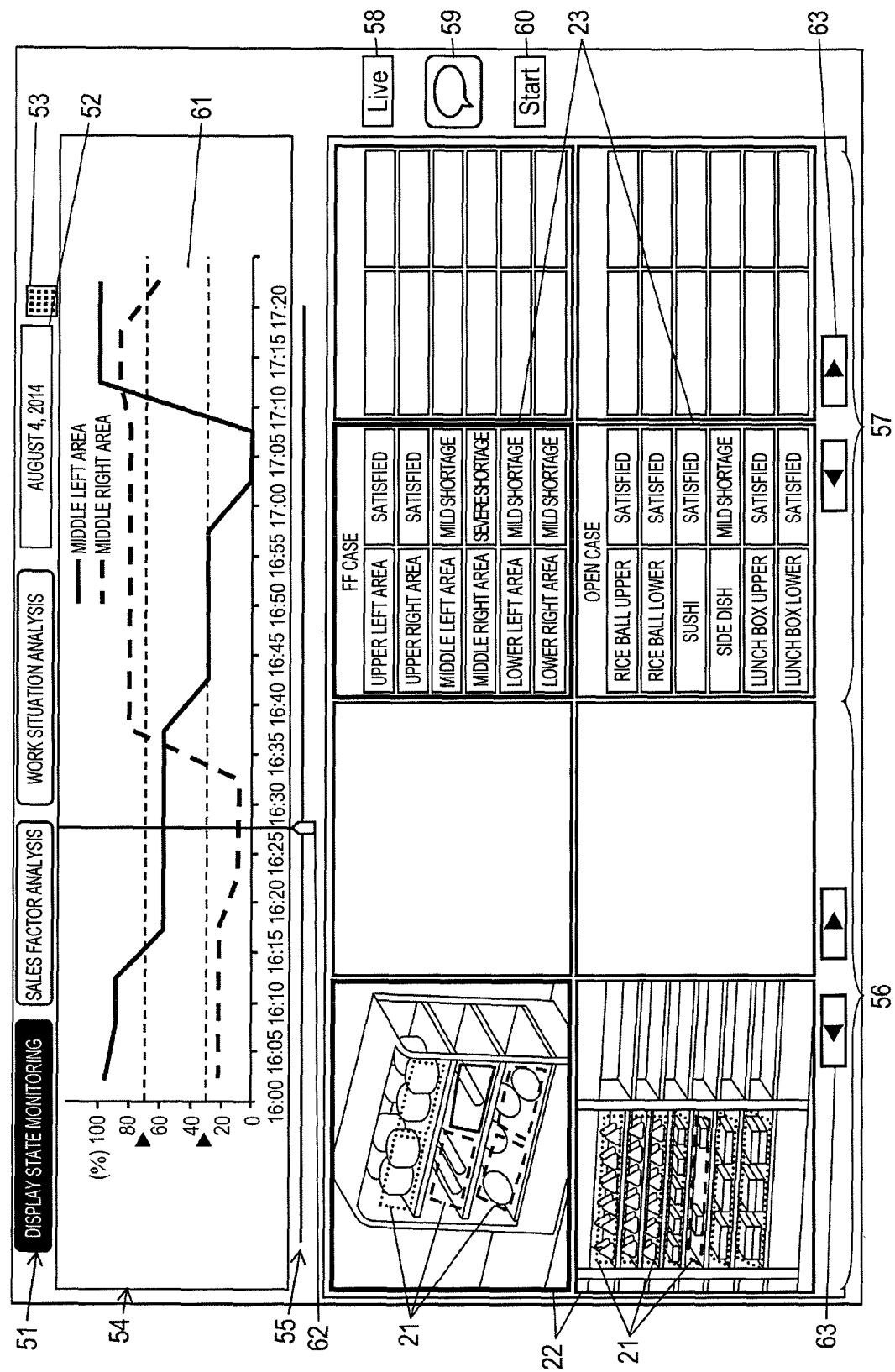
FIG. 7 is an explanatory diagram illustrating a monitoring screen displayed on monitor 9 in a display state monitoring mode.
Figure 8:
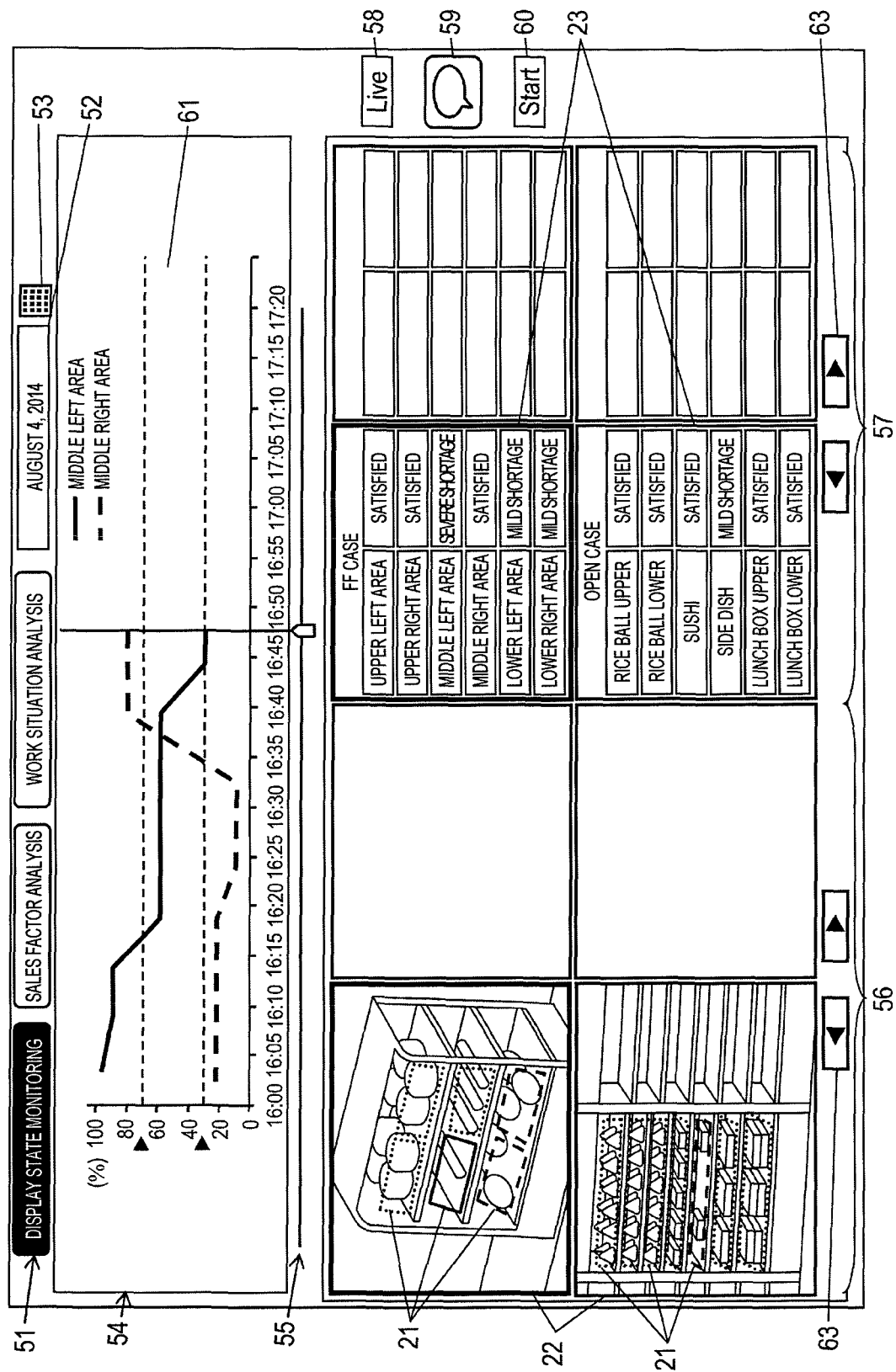
FIG. 8 is an explanatory diagram illustrating a monitoring screen displayed on monitor 9 in the display state monitoring mode.

Next, a monitoring screen in the display state monitoring mode displayed on monitor 9 illustrated in FIG. 1 will be described. FIG. 7 and FIG. 8 are explanatory diagrams illustrating the monitoring screen displayed on monitor 9 in the display state monitoring mode. FIG. 7 illustrates the situation on the designated date in the past, and FIG. 8 illustrates the situation of the day in real time.

The monitoring screen is used for the user to monitor the display status of item in the display area (such as the display shelf), and this monitoring screen has operation mode selector 51, date display portion 52, date selector 53, time chart display portion 54, display time operation portion 55, image display portion 56, text display portion 57, display mode selector 58, warning icon 59, and start indicator 60.

Figure 14:
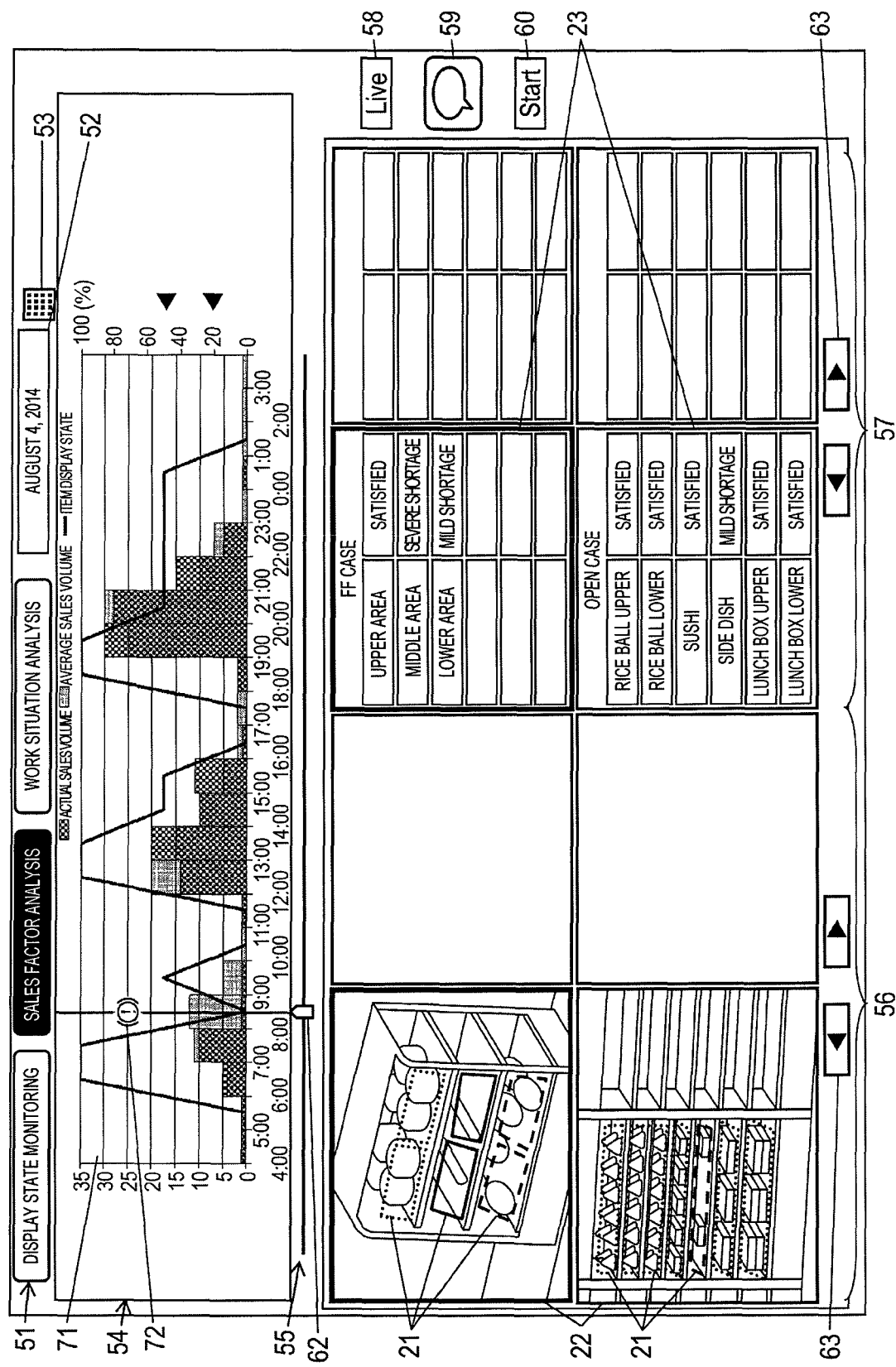
FIG. 14 is an explanatory diagram illustrating a monitoring screen displayed on monitor 9 in a sales factor analysis mode.

Operation mode selector 51 is used for the user to select an operation mode. In the present exemplary embodiment, it is possible to select any one of a display state monitoring mode, a sales factor analysis mode, and a work situation analysis mode. If the display state monitoring mode is selected, the monitoring screens illustrated in FIG. 7 and FIG. 8 are displayed. If the sales factor analysis mode is selected, the monitoring screen illustrated in FIG. 14 is displayed, and if the work situation analysis mode is selected, the monitoring screen illustrated in FIG. 16 or the like is displayed.

Date display portion 52 is used to display date, and date of the day is displayed in an initial state when the monitoring screen is opened. Date selector 53 is used for the user to set a date. If date selector 53 is operated, a calendar screen, not illustrated, is displayed.

When a date is selected on the calendar screen, the selected date is displayed on date display portion 52, and the time chart and monitoring image of the selected date are displayed on time chart display portion 54 and image display portion 56, respectively.

Time chart 61 illustrating temporal transition of the display state is displayed on time chart display portion 54. In time chart 61, an item occupancy rate is represented by a line graph, the horizontal axis is time and the vertical axis is item occupancy rate (%). The user can recognize the temporal transition of the display state, based on time chart 61.

In image display portion 56, the monitoring image (such as a display shelf) of each display area is displayed in image area 22. In this monitoring image, frame image 21 of each state monitoring area, which is color-coded according to the display state of item, is displayed by being superimposed on the image of the display area.

Display time operation portion 55 is used to adjust the display time of the monitoring image displayed in image display portion 56, and it is possible to perform switching to the monitoring image at a desired time by operating display time operation portion 55. Specifically, slider 62 is provided so as to be movable along the time axis of time chart 61, and if slider 62 is shifted by using input device 8 such as a mouse, the monitoring image at the time pointed by slider 62 is displayed in image display portion 56.

In text display portion 57, display states (a satisfied state, a mild shortage state, and a severe shortage state) for each state monitoring area in each display area (such as a display shelf) are displayed as a text in text area 23.

Display mode selector 58 is for the user to select a real time display mode.

Here, if the real time display mode is selected, a monitoring screen (see FIG. 8) displaying the situation of the day in real time is displayed. On this monitoring screen, the situation up to the current time is displayed. In a case where the real time display mode is not selected, a monitoring screen (see FIG. 7) displaying a log display mode, that is, the status of the date selected in date selector 53 is displayed.

Warning icon (warning display unit) 59 is used to inform the user of an event (caution event) which needs to urge caution to the user regarding the display state of item, by changing the image. Warning icon 59 will be explained in detail later.

Start indicator 60 is used to start the process of outputting a monitoring screen under the specified conditions, and if start indicator 60 is operated, the date selected in date selector 53 or the time chart of the day, the monitoring image, and text information are displayed in time chart display portion 54, image display portion 56, and text display portion 57, respectively. In a case where the number of state monitoring areas exceeds the number of state monitoring areas that can be displayed at once and set as a monitoring object, it is possible to change the state monitoring area to be displayed by using scroll button 63.

The time chart of the state monitoring area is displayed in time chart display portion 54, but the selection of the state monitoring area to be displayed in time chart display portion 54 can be performed in image display portion 56 and text display portion 57. Specifically, after selecting desired image area 22 in image display portion 56, a time chart of the state monitoring area is displayed in time chart display portion 54 by operating (clicking) frame image 21 of the state monitoring area in the displayed monitoring image, and a time chart of a state monitoring area name is displayed in the time chart display portion, by operating the display portion of the state monitoring area name in text display portion 57. It is also possible to cancel the selected state, by operating (clicking) again frame image 21 or the state monitoring area name in a state where the state monitoring area is selected. FIG. 7 and FIG. 8 illustrate a state where two state monitoring areas at the middle stage of the FF case are operated by the user. The selection state of the state monitoring area is represented by thickening the frames of image area 22 and frame image 21 in image display portion 56, or may be represented by thickening the frame of text area 23 as well as highlighting the display portion of the state monitoring area name in text display portion 57. The display form concerning the selection and non-selection of the state monitoring area is not limited to this, and various display forms can be adopted.

As illustrated in FIG. 8, when displaying a monitoring screen displaying the situation of the day in real time, if work detector 37 detects that the item management work is executed based on the change state of the display state of item, the monitoring image of the corresponding state monitoring area may be displayed on image display portion 56. In this way, it is possible to check promptly the actual situation of the state monitoring area in which the execution of the item management work is detected, based on the monitoring image.

Figure 9:
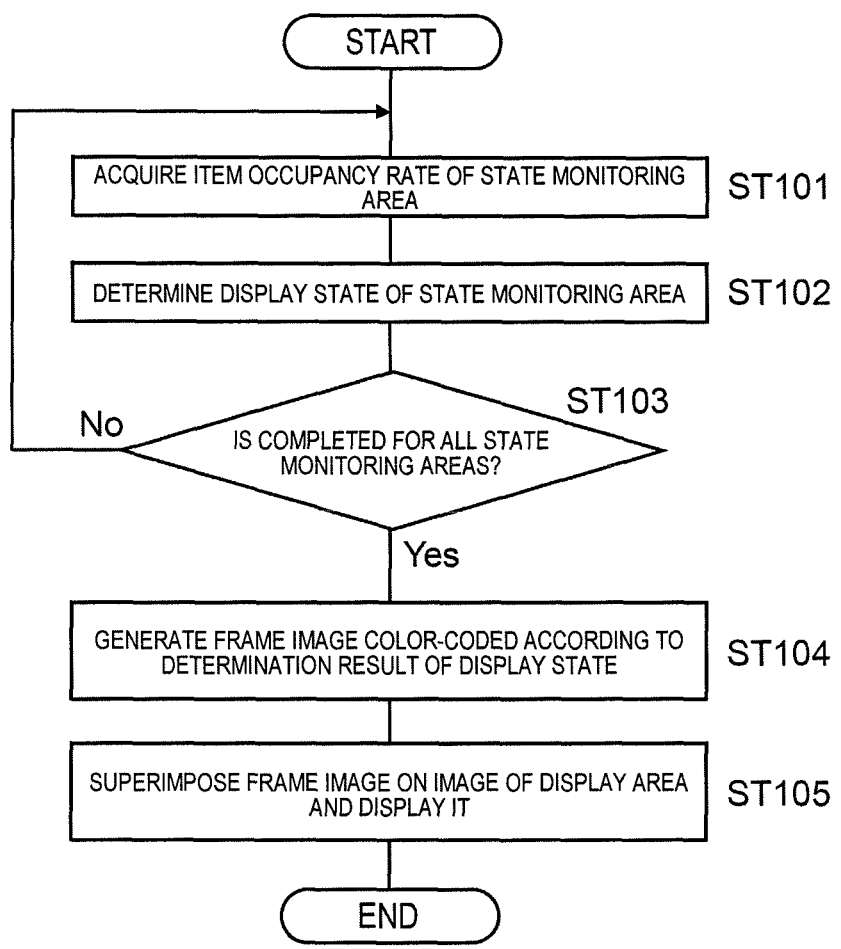
FIG. 9 is a flowchart illustrating a procedure of a process performed by PC 3 to output a monitoring screen in the display state monitoring mode.

Next, the process executed by PC 3 to output the monitoring screen in the display state monitoring mode illustrated in FIG. 7 and FIG. 8 will be described. FIG. 9 is a flowchart illustrating a procedure of a process executed by PC 3 to output a monitoring screen in the display state monitoring mode.

In the present exemplary embodiment, first, item detector 32 executes a process of detecting item from the image of the state monitoring area, and acquires the item occupancy rate of the state monitoring area (ST101). Next, display state determinator 33 determines the display state (such as a satisfied state, a mild shortage state, or a severe shortage state) of the state monitoring area, based on the detection result by item detector 32 (ST102).

These processes are repeated until the processes are completed for all of the state monitoring areas.

When the processes for all of the state monitoring areas is completed (YES in ST103), display screen generator 46 generates a frame image which is color-coded according to the display state of item for each state monitoring area, based on the determination result by display state determinator 33 (ST104). Next, a monitoring image in which the frame image for each state monitoring area is superimposed on the image of the display area is generated, and screen information on a monitoring screen including the monitoring image is generated and output (ST105). Thus, the monitoring screens illustrated in FIG. 7 and FIG. 8 are displayed on monitor 9.

Display screen generator 46 executes a process of generating a time chart representing a temporal transition of an item occupancy rate, based on the detection result by item detector 32, or a process of generating display information of text display portion 57, based on the determination result by display state determinator 33, in addition to the process of generating a monitoring image.

Figure 10:
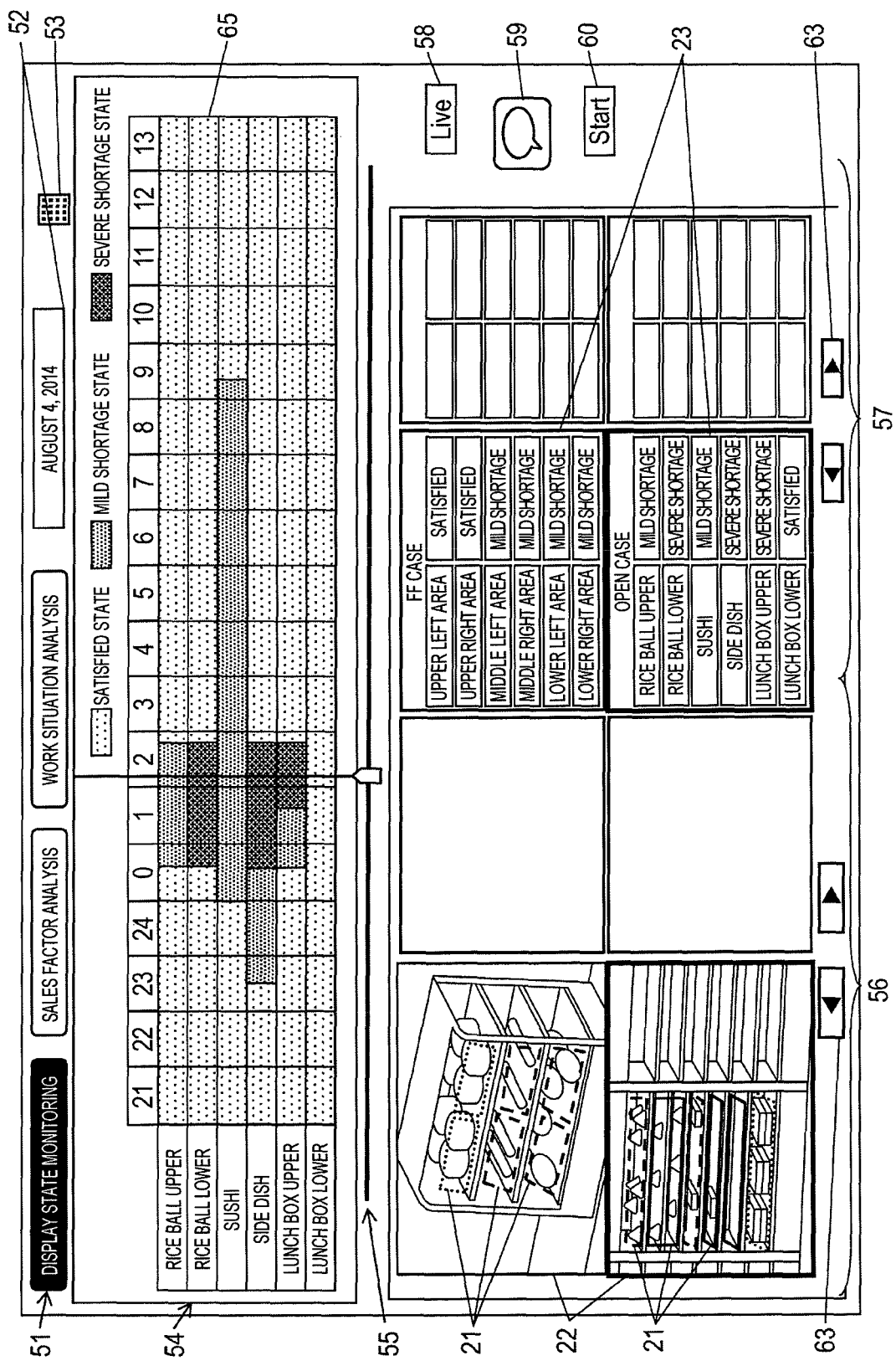
FIG. 10 is an explanatory diagram illustrating another example of the monitoring screen displayed on monitor 9.

Next, another example of the monitoring screen displayed on monitor 9 illustrated in FIG. 1 will be described. FIG. 10 is an explanatory diagram illustrating another example of the monitoring screen displayed on monitor 9.

In the example illustrated in FIG. 7, time chart 61 of a graph illustrating temporal transition of an item occupancy rate in each state monitoring area is displayed in time chart display portion 54, but in the example illustrated in FIG. 10, time chart 65 in which the durations of the display states of item (the satisfied state, the mild shortage state, and the severe shortage state) are displayed in a color-coded manner is displayed in time chart display portion 54, in the same way as a so-called Gantt chart. In time chart 65, the respective durations of the satisfied state, the mild shortage state and the severe shortage state may be displayed in green, yellow and red, respectively, as in frame image 21 (see FIG. 4A to FIG. 4F).

In such a time chart, the user cannot recognize the change state of the item occupancy rate in each state monitoring area, but the user can promptly recognize a temporal transition of the display state of each state monitoring area. It is possible to check the display states of a large number of state monitoring areas at the same time, and in particular, the user can promptly recognize the state monitoring area with a problem, by comparing the display states of respective state monitoring areas.

Next, warning icon 59 displayed on the monitoring screen illustrated in FIG. 8 will be described. FIG. 11A to FIG. 11C are explanatory diagrams illustrating a change state of warning icon 59 displayed on the monitoring screen. The operation related to warning icon 59 is executed in a state where the monitoring screen representing the status of the day in real time is displayed, as illustrated in FIG. 8.

In the present exemplary embodiment, caution event detector 38 executes a process of detecting an event which needs to urge caution to the user regarding the display state of item, that is, an event in which a change in the display state occurs such as occurrence of a shortage state, or returning to a satisfied state, an event in which a shortage state continues for a long time, or the like, and display screen generator 46 executes a process of changing the display of warning icon 59, based on the detection result by caution event detector 38.

Warning icon 59 notifies the user of a caution event by a change in an image, and changes according to detection of the caution event. FIG. 11A illustrates a normal time, that is, a case where a caution event does not occur, FIG. 11B illustrates a case where a display shortage state (a mild shortage state and a severe shortage state) occurs, and FIG. 11C illustrates a case where the display shortage state continues for a predetermined time or longer.

In warning icon 59, when a caution event occurs, characters indicating the state monitoring area at which the caution event occurs are displayed, as illustrated in FIG. 11B and FIG. 11C. In the example illustrated in FIG. 9, characters "FF" indicating the display shelf of fast food are displayed. In respective states illustrated in FIG. 11A, FIG. 11B, and FIG. 11C, the warning level becomes higher sequentially, and the height of the warning level is expressed by changing the display color of the warning icon. For example, the display colors of the warning icons 59 in the respective states illustrated in FIG. 11A, FIG. 11B, and FIG. 11C are assumed to be green, yellow and red, respectively. In the states illustrated in FIG. 11B and FIG. 11C, warning levels higher than the state illustrated in FIG. 11A are represented by changing the picture of warning icon 59.

Next, a message box displayed on monitor 9 illustrated in FIG. 1 will be described. FIG. 12 is an explanatory diagram illustrating a message box displayed on monitor 9.

In the present exemplary embodiment, caution event detector 38 executes a process of detecting a caution event which needs to urge caution to the user regarding the display state of item, based on the determination result by display state determinator 33, and display screen generator 46 executes a process of displaying a message box (message display portion) notifying the user of the content of the caution event by using characters, based on the detection result by caution event detector 38, as illustrated in FIG. 12.

In this message box, the detection results over the past predetermined period by the caution event detector 38 are listed and displayed. Specifically, for each detected caution event, the state monitoring area where the caution event has occurred, the time when the caution event has occurred, and the wording indicating the specific state of the caution event are displayed. This message box is displayed with a pop-up by operating (clicking) the warning icon 59 on the monitoring screen illustrated in FIG. 8.

Figure 13:
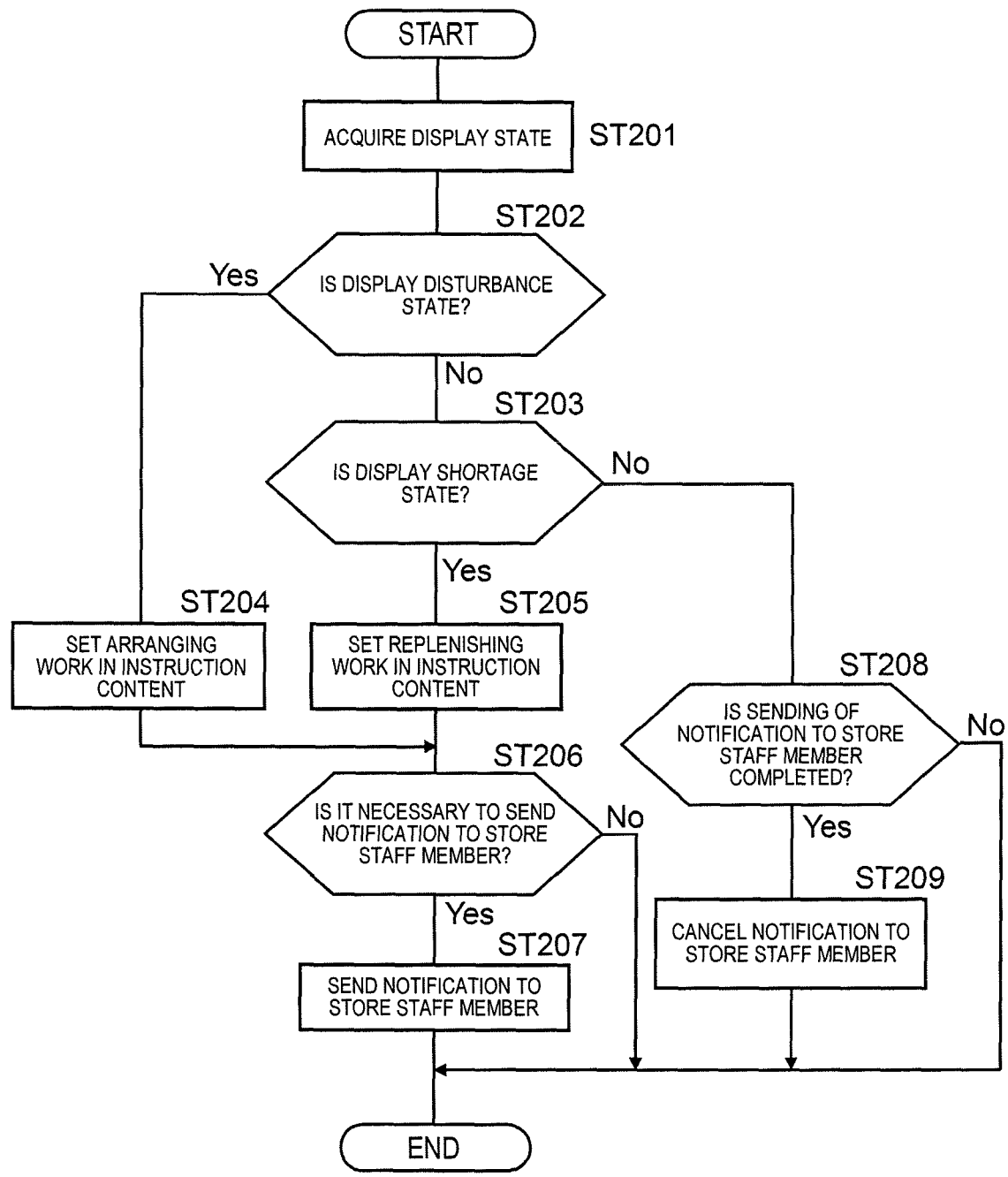
FIG. 13 is a flowchart illustrating a procedure of a process performed by alert determinator 39.

Next, a process executed by alert determinator 39 illustrated in FIG. 6 will be described. FIG. 13 is a flowchart illustrating a procedure of a process executed by alert determinator 39.

In the present exemplary embodiment, display state determinator 33 makes a determination on a display disturbance state and a display shortage state, as a display state, and alert determinator 39 determines propriety of a notification instructing a store staff member to perform any one of an arranging work to resolve a disturbance in display, and a replenishing work to resolve the shortage of item, as an item management work, based on the determination result by display state determinator 33.

Specifically, first, a display state (a display disturbance state and a display shortage state) of item is acquired from display state determinator 33 (ST201). In the display disturbance state (YES in ST202), the arranging work to resolve a disturbance in display is set in the instruction contents (ST204). If the state is not the display disturbance state (NO in ST202) but the display shortage state (YES in ST203), the replenishing work to resolve the shortage of item is set in the instruction content (ST205). It is determined whether or not it is necessary to make a notification instructing a store staff member to perform an item management work (ST206), and if it is necessary to send the notification to the store staff member (YES in ST206), alert executer 40 makes a notification instructing the store staff member to perform a necessary item management work (ST207).

On the other hand, if the display is not in the display disturbance state and the display shortage state (NO in ST203), it is determined whether or not the notification to instruct the store staff member to perform the item management work has already been made (ST208), and if the notification has already been made (YES in ST208), it is determined that the store staff member performs the item management work and the display disturbance state and the display shortage state are resolved, and the corresponding notification is cancelled (ST209).

Next, the monitoring screen in the sales factor analysis mode will be described. FIG. 14 is an explanatory diagram illustrating a monitoring screen displayed on monitor 9 in a sales factor analysis mode.

On this monitoring screen, time chart 71 representing a temporal transition of the display state and sales situation of item is displayed in time chart display portion 54. In time chart 71, the display state (item occupancy rate) for each time zone (unit time) is represented by a line graph, and the actual sales volume and the average sales volume for each time zone are represented by a bar graph. In time chart display portion 54, alert mark 72 is superimposed and displayed in a corresponding position in a time-axis direction on time chart 71, as an image representing a caution point at which a sales opportunity loss is supposed to occur.

From this monitoring screen, the user can promptly recognize a time zone during which a sales opportunity loss is supposed to occur, based on alert mark 72 displayed in time chart display portion 54. It is possible to recognize abnormality in the sales situation of item, by comparing the actual sales volume displayed in time chart display portion 54 with the average sales volume. Then, if the user sees the display state (the item occupancy rate) displayed in time chart display portion 54, the user can determine that a sales opportunity loss occurs due to a defect in the display of item.

In the example illustrated in FIG. 14, since the actual sales volume in an eight o'clock time zone is significantly smaller than the average sales volume, alert mark 72 is displayed in the eight o'clock time zone. In the eight o'clock time zone, item are in a severe shortage state.

If the monitoring image of the eight o'clock time zone is displayed in image display portion 56 by operating slider 62, the actual situation at the eight o'clock time zone can be checked with an image.

If a state monitoring area is selected on the monitoring screen, for example, image area 22 and frame image 21 displayed in image display portion 56 are selectively operated, or a state monitoring area name displayed in text display portion 57 is selectively operated, a time chart of the selected state monitoring area is displayed in time chart display portion 54.

Figure 15:
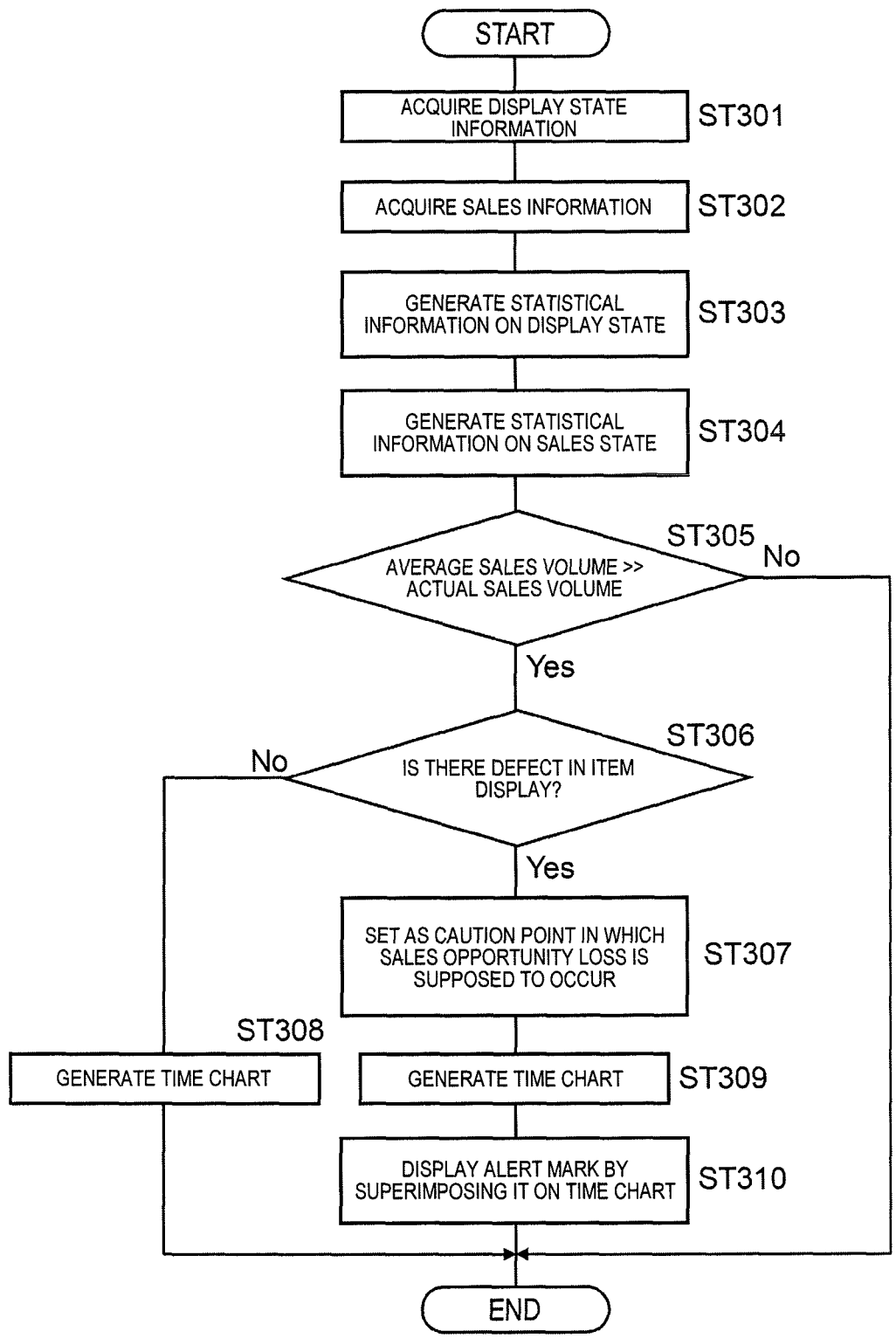
FIG. 15 is a flowchart illustrating a procedure of a process performed by PC 3 to output a monitoring screen in the sales factor analysis mode.

Next, the process executed by PC 3 to output the monitoring screen in the sales factor analysis mode illustrated in FIG. 14 will be described. FIG. 15 is a flowchart illustrating a procedure of a process executed by PC 3 to output a monitoring screen in the sales factor analysis mode.

In the present exemplary embodiment, first, statistical information generator 41 acquires the display state information on the designated date from display state information storage 34 (ST301). Sales information obtainer 42 acquires sales information over a required period from the sales information management device (ST302).

Statistical information generator 41 executes a statistical process on the display state information on the designated date with time to generate statistical information on the display state of item (ST303). Specifically, the item occupancy rates at respective times in each state monitoring area are aggregated for each time zone (unit time), and the item occupancy rate for each time zone in each state monitoring area is acquired.

Statistical information generator 41 executes a statistical process on the sales information over a required period with time to generate statistical information on the sales situation of item (ST304). Specifically, the actual sales volume for each time zone (unit time) on the specified date is acquired, based on the sales information on the specified date. The average sales volume for each time zone (unit time) is acquired, based on the sales information over the past predetermined period, as the standard sales volume which is a standard for evaluating the actual sales volume.

Next, sales opportunity loss analyzer 44 sets a caution point at which a sales opportunity loss is supposed to occur, based on the statistical information on the display state and sales situation of item, which is generated by statistical information generator 41, and the display state information on a designated date acquired from display state information storage 34.

In this process, a determination is made as to whether or not the actual sales volume becomes significantly smaller than the average sales volume, more specifically, whether or not the difference between the actual sales volume and the average sales volume is equal to or greater than a predetermined threshold, by comparing the actual sales volume with the average sales volume for each time zone (unit time) (ST305). Here, in a case where there is a time zone during which the actual sales volume is significantly smaller than the average sales volume (YES in ST305), then a determination is made as to whether or not there is a defect in the display of item in the time zone, that is, whether or not it is the display disturbance state or the display shortage state (ST306).

Here, in a case where there is a defect in the display of item (YES in ST306), it is determined that a sales opportunity loss is supposed to occur in the time zone, and the time or time zone is set as a caution point (ST307).

Next, display screen generator 46 generates time chart 71 representing the sales situation and the temporal transition of the display state of item, based on the statistical information (the actual sales volume and the average sales volume for each time zone) on the sales situation of item generated by statistical information generator 41 and the statistical information on the display state of and item (the item occupancy rate for each time zone) on the display state of item, as an image representing these statistical information (ST309).

Display screen generator 46 generates and outputs screen information for displaying alert mark 72 representing a caution point by superimposing the image on time chart 71, based on the time or time zone of the caution point acquired by sales opportunity loss analyzer 44 (ST310). Thus, the monitoring screen illustrated in FIG. 14 is displayed on monitor 9.

In contrast, in a case where there is no defect in the display of item (NO in ST306), it is determined that the abnormality in the sales volume, in which the actual sales volume is significantly smaller than the average sales volume, is caused by another factor, such that without executing a process on the caution point, display screen generator 46 generates time chart 71 representing the temporal transition of the sales situation and the display state of item, and generates and outputs screen information for displaying time chart 71 (ST308).

After comparative determination (ST305) of the actual sales volume and the average sales volume, a determination is made as to whether or not the number of visiting customers to the store is significantly large, specifically, whether or not the number of visiting customers to the store is equal to or greater than a predetermined threshold.

In a case where the number of visiting customers to the store is significantly large and there is a defect in the display of item, it is determined that a sales opportunity loss is supposed to occur, and the time zone may be set as the caution point. This makes it possible to avoid erroneously setting a caution point, in a case where the abnormality of a sales volume occurs in which the actual sales volume is significantly smaller than the average sales volume due to a decrease in the number of visiting customers to the store.

Figure 16:
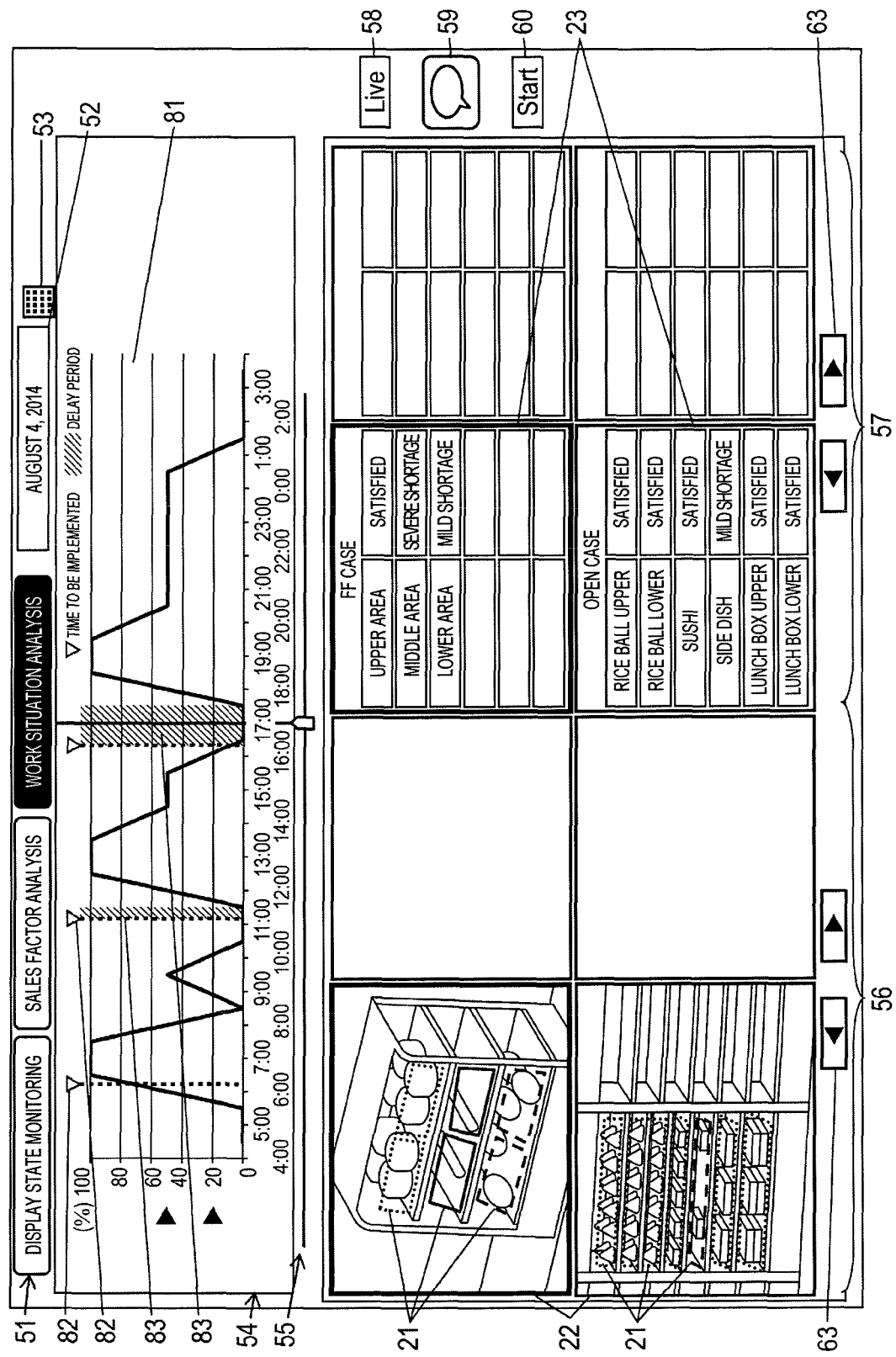
FIG. 16 is an explanatory diagram illustrating a monitoring screen displayed on the monitor 9 in a work situation analysis mode.

Next, the monitoring screen in the work situation analysis mode will be described. FIG. 16 is an explanatory diagram illustrating a monitoring screen displayed on monitor 9 in a work situation analysis mode.

On this monitoring screen, time chart 81 representing a temporal transition of the display state is displayed in time chart display portion 54. In time chart 81, the item occupancy rate for each time zone (unit time) is represented by a line graph. In time chart display portion 54, image 82 representing a timing to be implemented of the item management work specified on the work schedule and image 83 representing a delay period are superimposed and displayed in a corresponding position in a time-axis direction on time chart 81. A delay period is a period up to a timing at which the item management work is supposed to be executed due to a change in a display state, from a timing to be implemented of the item management work.

The user can recognize the status of compliance with the work schedule, that is, whether or not the store staff member appropriately performs the item management work according to the work schedule, based on the image 82 representing a timing to be implemented of the item management work and the image 83 representing a delay period. It is possible to determine whether or not the timing to be implemented or the work contents (for example, prepared amount) of the item management work is appropriate, by comparing the timing to be implemented and the delay period of the item management work with time chart 81, and thus it is possible to efficiently evaluate and review a work schedule.

The display colors of image 82 representing a timing to be implemented and image 83 representing a delay period may be changed according to times at which respective images 82, 83 are located or the length of a delay period.

Figure 17:
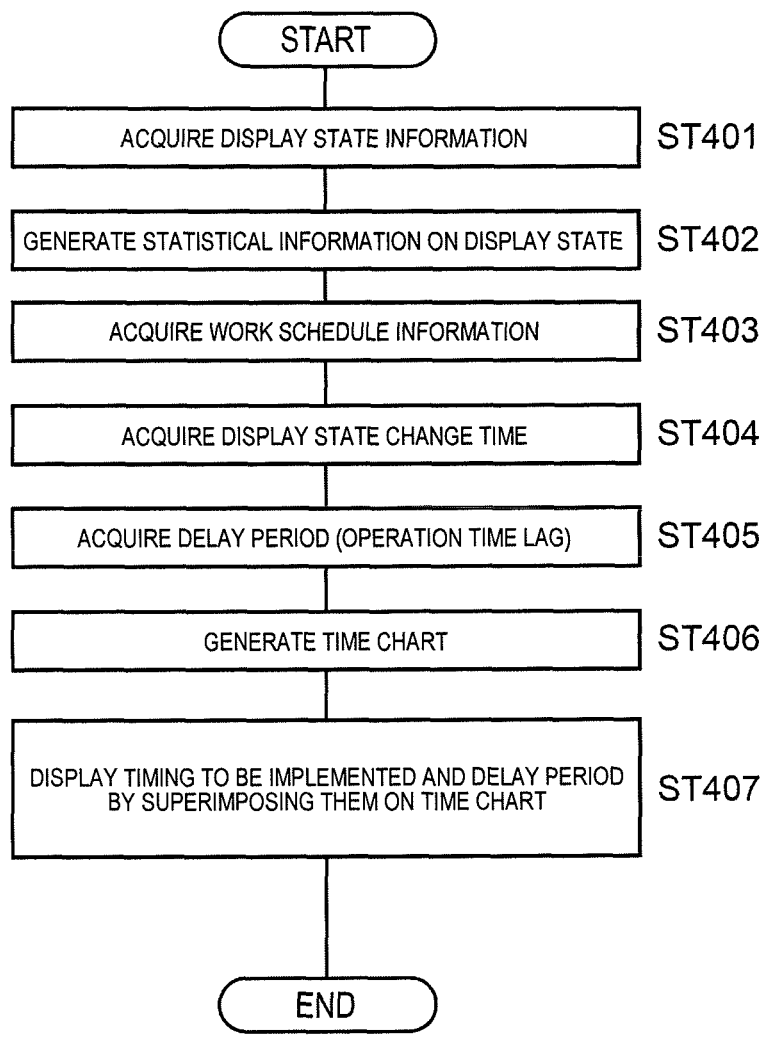
FIG. 17 is a flowchart illustrating a procedure of a process performed by PC 3 to output a monitoring screen in the work situation analysis mode.

Next, the process executed by PC 3 to output a monitoring screen in the work situation analysis mode illustrated in FIG. 16 will be described. FIG. 17 is a flow chart illustrating a procedure of the process executed by PC 3 to output the monitoring screen in the work situation analysis mode.

In the present exemplary embodiment, first, statistical information generator 41 acquires the display state information on the designated date from display state information storage 34 (ST401). A statistical process is executed on the display state information on the designated date with time to generate statistical information on the display state of item (ST402). Specifically, the item occupancy rates at respective times in each state monitoring area are aggregated for each time zone (unit time), and the item occupancy rate for each time zone in each state monitoring area is acquired.

Work implementation status analyzer 45 acquires work schedule information on the work schedule on the designated date from store business management device 6 through work schedule information obtainer 43 (ST403). In this case, a work schedule of the item management work that gives a big impact on the display state of item, that is, a replenishing and preparing work to resolve the shortage of item and a work of discarding item, is acquired as work schedule information.

Subsequently, work implementation status analyzer 45 acquires a timing (display state change time) at which there is a change in the display state by the item management work being supposed to be executed, based on the display state information (item occupancy rate for each time) acquired from display state information storage 34 (ST404).

Then, work implementation status analyzer 45 compares a timing (a display state change time) at which the display state changes with a timing to be implemented (a time to be implemented) of the item management work specified in the work schedule to acquire a delay period (operation time lag), that is, a period up to the timing at which the item management work is supposed to be executed due to the change of display state, from a timing to be implemented of the item management work (ST405).

Next, display screen generator 46 generates time chart 81 illustrating temporal transition of the display state of item, as an image representing the statistical information, based on statistical information (item occupancy rate per unit time) on the display state of item (ST406). Screen information for displaying image 82 representing a timing to be implemented and image 83 representing a delay period by superimposing them on time chart 81 is generated (ST407). Thus, the monitoring screen illustrated in FIG. 16 is displayed on monitor 9.

Figure 18:
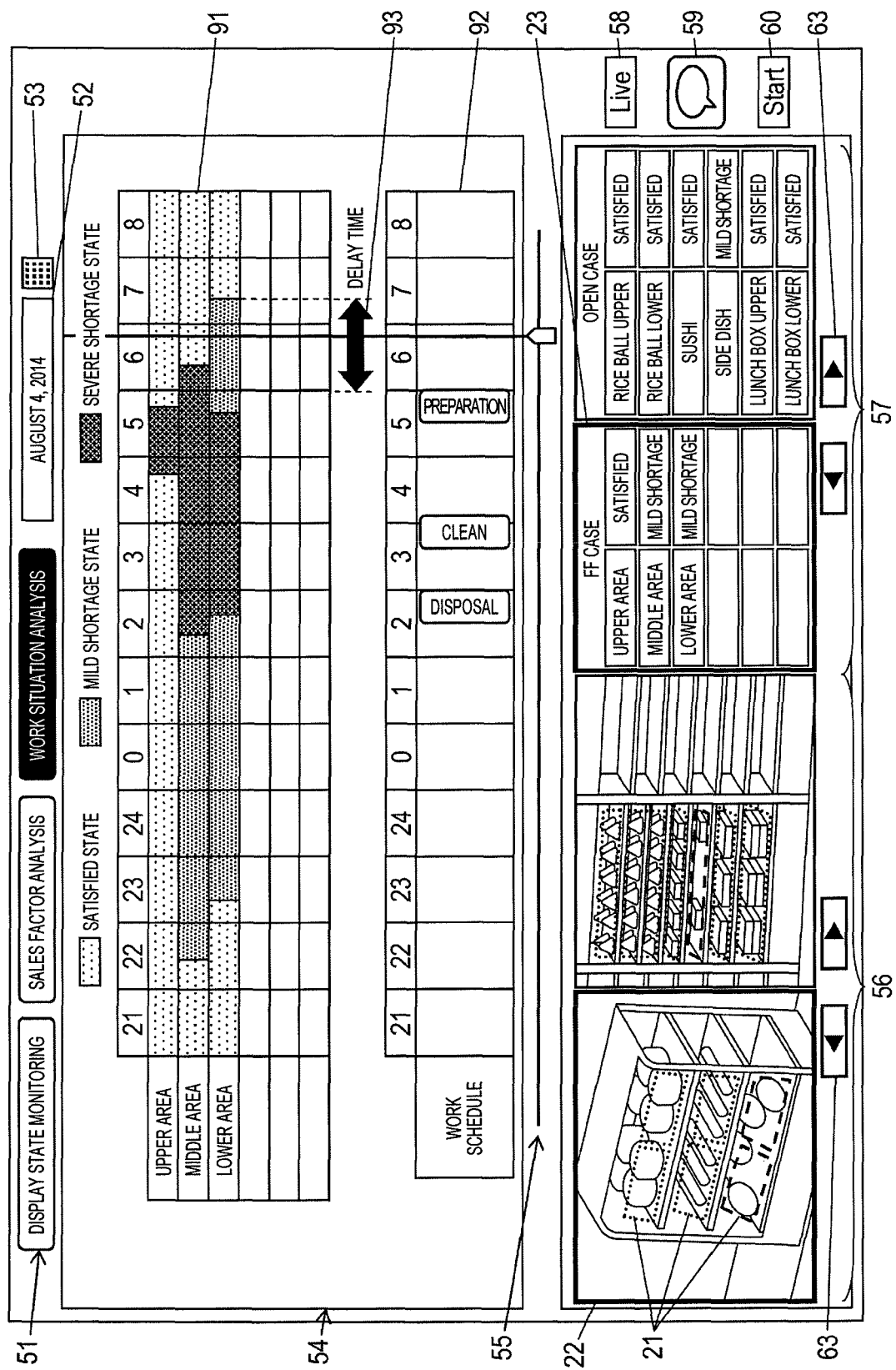
FIG. 18 is an explanatory diagram illustrating another example of a monitoring screen in the work situation analysis mode.
Figure 19:
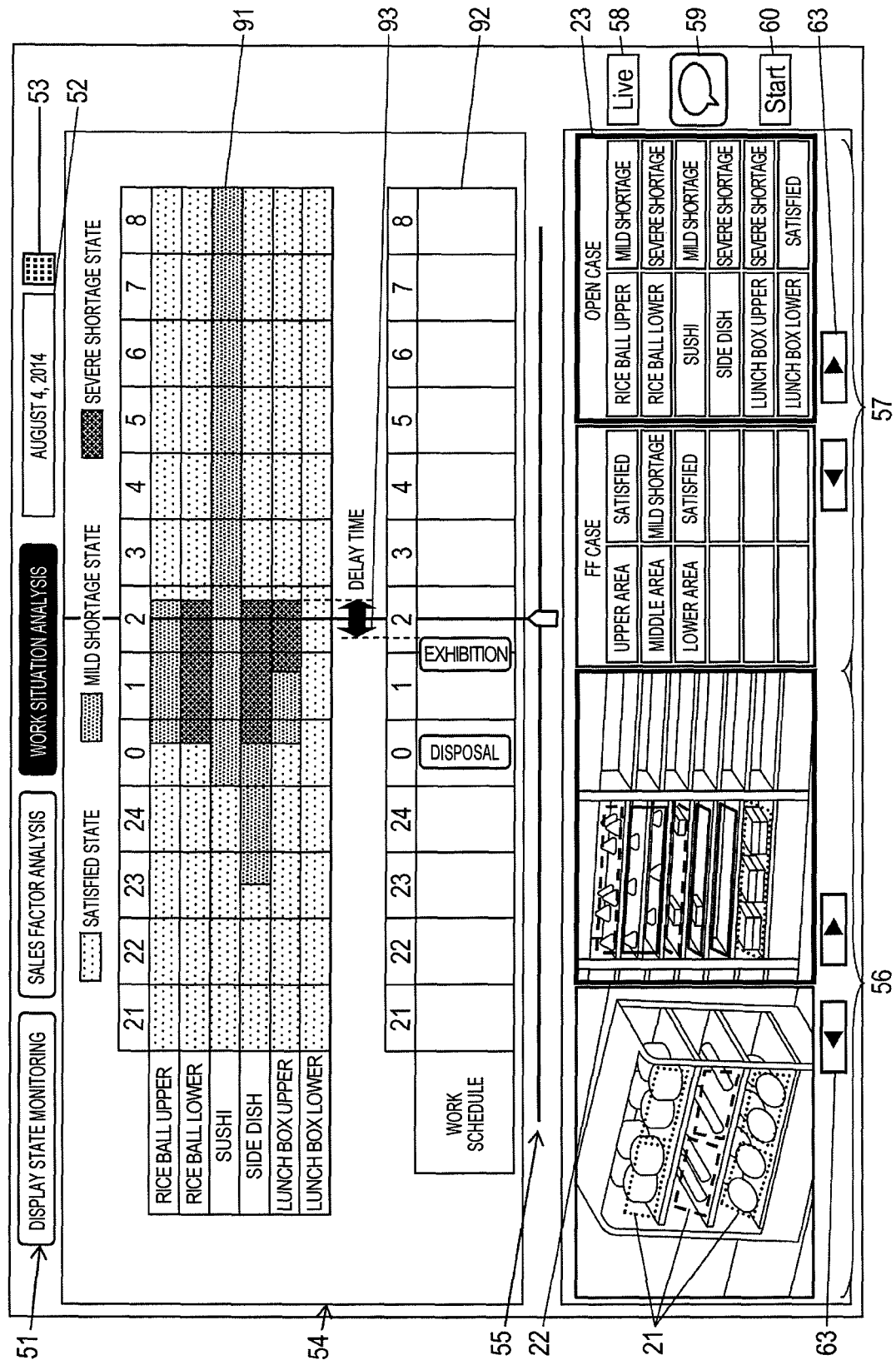
FIG. 19 is an explanatory diagram illustrating another example of a monitoring screen in the work situation analysis mode.

Next, another example of the monitoring screen in the work situation analysis mode will be described. FIG. 18 and FIG. 19 are explanatory diagrams illustrating another example of a monitoring screen in the work situation analysis mode.

In the example illustrated in FIG. 16, time chart 81 of a graph (a line graph) illustrating an item occupancy rate for each time zone in each state monitoring area is displayed in time chart display portion 54, but in the examples illustrated in FIG. 18 and FIG. 19, time chart 91 in which the durations of the display states of item (the satisfied state, the mild shortage state, and the severe shortage state) are displayed in a color-coded manner is displayed in time chart display portion 54, as in the example illustrated in FIG. 10.

Image 92 representing a work schedule of the item management work is displayed so as to correspond to the time of time chart 91, in time chart display portion 54. Image 93 representing a delay period up to the timing at which the item management work is supposed to be executed, from a timing to be implemented of the item management work, specified in the work schedule is displayed in time chart display portion 54.

Figure 20A:
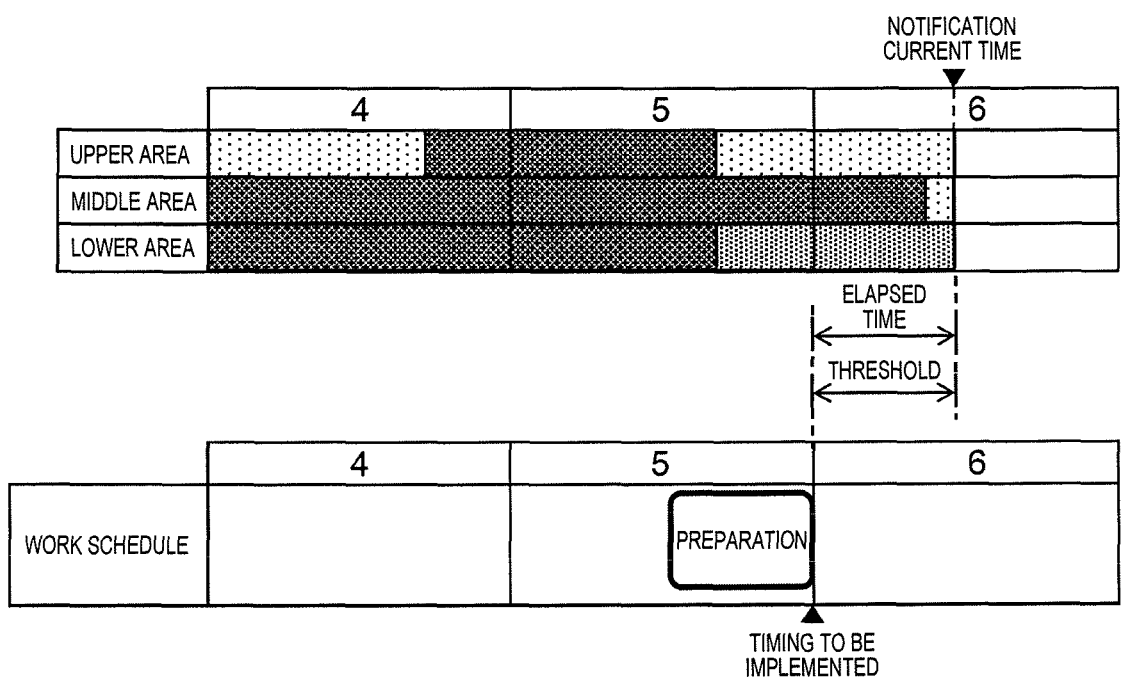
FIG. 20A is an explanatory diagram illustrating an outline of a notification process based on a work schedule.
Figure 20B:
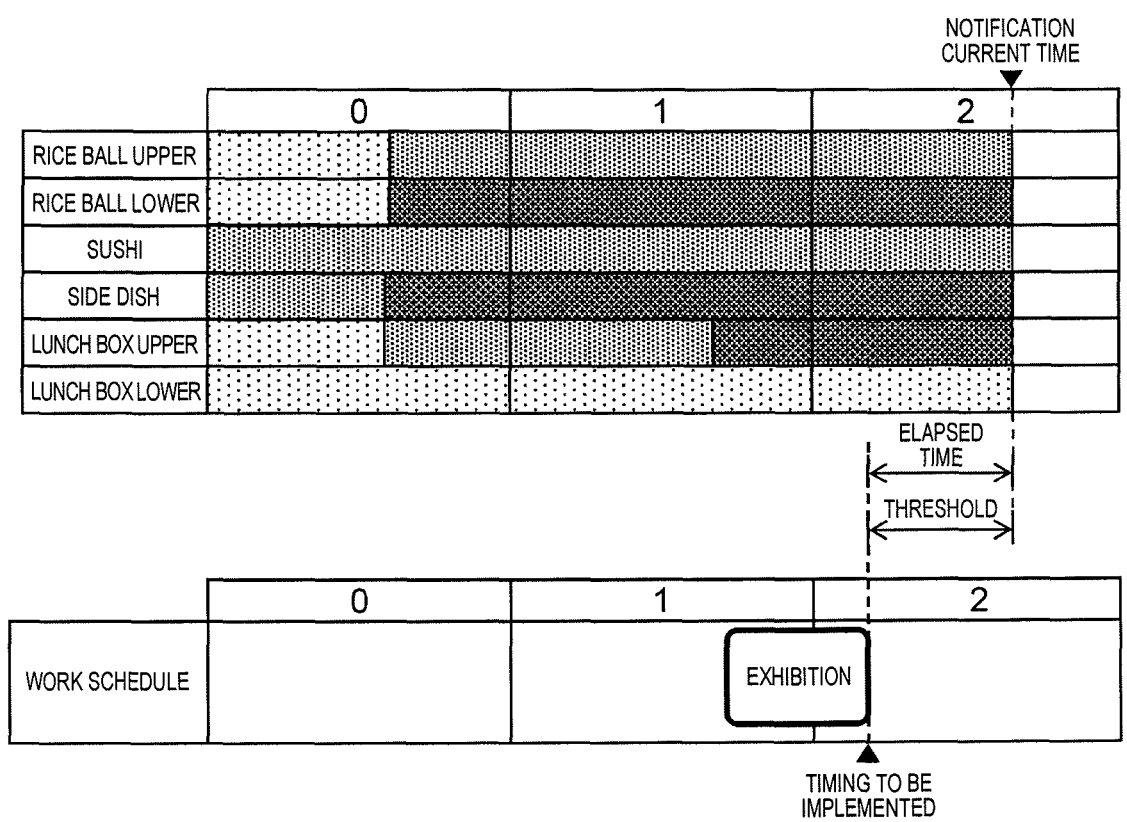
FIG. 20B is an explanatory diagram illustrating an outline of a notification process based on a work schedule.

Next, notification based on a work schedule will be described. FIG. 20A and FIG. 20B are explanatory diagrams illustrating an outline of a notification process based on a work schedule.

In the present exemplary embodiment, work detector 37 executes a process of detecting whether or not the item management work is executed, based on the change state of the display state of item acquired by display state determinator 33, and alert determinator 39 executes a process of determining propriety of a notification instructing the store staff member to perform the item management work, based on the detection result by work detector 37 and the work schedule information acquired by work schedule information obtainer 43.

Here, although a timing to be implemented of an item management work which is specified in the work schedule of the work schedule information is elapsed, in a case where work detector 37 does not detect the execution of the corresponding item management work, alert determinator 39 determines that the item management work is left untreated, and if an elapsed time from the timing to be implemented of the item management work reaches a predetermined threshold, alert determinator 39 determines to make a notification instructing the store staff member to perform the item management work.

Alert executer 40 makes a notification instructing the store staff member or the store manager staying in the store and the administrator staying in the head office to perform an item management work, according to the determination result by alert determinator 39. This notification may be made using mobile terminal 4 owned by the store staff member or the store manager or PC 11 installed at the head office.

As illustrated in FIG. 8, a fact that the notification instructing the item management work is made may be displayed by an appropriate method, for example, an icon, on the monitoring screen displaying the situation of the day in real time.

As described above, in the present exemplary embodiment, state monitoring area setter 35 sets the state monitoring area on the image of the display area, and item detector 32 detects item displayed in the state monitoring area, based on the image of the display area. Display state determinator 33 determines a display state of item in the state monitoring area, based on a detection result by item detector 32. Display screen generator 46 generates a monitoring screen including a monitoring image in which a display state displaying image (frame image 21) representing the display state of item in the state monitoring area is superimposed on the image of the display area, based on a determination result by display state determinator 33. Therefore, the user can immediately recognize the display state of item, based on the display state displaying image in the monitoring image. Further, the user can check the actual status of item, based on the image of the display area in the monitoring image. In this way, it is possible to easily check the implementation status of the item management work by the store staff member, that is, whether or not the store staff member has quickly and appropriately performed the item management work.

In the present exemplary embodiment, display screen generator 46 changes the display color of the display state displaying image depending on the display state, the user can immediately recognize the display state of item based on the display color of the display state displaying image.

Further, in the present exemplary embodiment, the display state displaying image is frame image 21 representing the state monitoring area set on the image of the display area, and the user can immediately recognize the display state of item and the range of the state monitoring area at the same time, based on the display state displaying image.

In the present exemplary embodiment, display state information storage 34 stores the detection result by item detector 32 and the determination result by display state determinator 33, as display state information, and display screen generator 46 generates time charts 61, 65, 71, 81, and 91 illustrating temporal transition of the display state of item, based on the display state information, and displays time charts 61, 65, 71, 81, and 91 and the monitoring image on the monitoring screen. Therefore, the user can recognize the display state of item in detail, based on the monitoring image, and the temporal transition of the display state of item, based on time charts 61, 65, 71, 81, and 91, at the same time.

In the present exemplary embodiment, display state determinator 33 makes a determination on a display disturbance state and a display shortage state, as a display state. Alert determinator 39 determines propriety of a notification instructing a store staff member to perform an arranging work to resolve a disturbance in display and a replenishing work to resolve the shortage of item, based on the determination result by the display state determinator, as the item management work. Alert executer 40 makes a notification instructing the store staff member to perform at least any one of the arranging work and the replenishing work, based on the determination result by alert determinator 39. Thus, in a case where there is a defect in the display of item, an appropriate notification can be made according to the contents of the defect. Then, the store staff member performs an appropriate item management work according to the contents of the notification, thereby removing the defect in the display of item swiftly.

In the present exemplary embodiment, display screen generator 46 is configured to display a character representing the display state of item, on the monitoring screen, in a state corresponding to the state monitoring area of the monitoring image, based on a determination result by display state determinator 33, and the user can immediately recognize the display state of item for each state monitoring area, based on the characters representing the display state of item.

In the present exemplary embodiment, caution event detector 38 detects a caution event which needs to urge caution to the user regarding the display state of item, based on the determination result by display state determinator 33.

Display screen generator 46 displays a message box (message display portion) indicating the contents of a caution event, based on the detection result by caution event detector 38. Therefore, the user can recognize the situation of a caution event, for example, an event in which there is a change in a display state or an event in which a defect state of the display of item continues for a long time, based on the message box.

In the present exemplary embodiment, display state information storage 34 stores the detection result by item detector 32 and the determination result by display state determinator 33, as display state information. Sales information obtainer 42 acquires sales information on the sales situation of item in the store, and statistical information generator 41 performs a statistical process on the sales information with time to generate statistical information on the sales situation of item. Sales opportunity loss analyzer 44 acquires a caution point at which a sales opportunity loss is supposed to occur, based on the statistical information. Display screen generator 46 generates time chart 71 illustrating temporal transition of the display state and sales situation of item, based on the display state information and the statistical information, and displays image 72 (alert mark) representing a caution point by superimposing the image on time chart 71. Therefore, the user can recognize the timing at which a sales opportunity loss is supposed to occur, based on image 72 representing a caution point.

In the present exemplary embodiment, display state information storage 34 stores the detection result by item detector 32 and the determination result by display state determinator 33, as display state information. Work schedule information obtainer 43 acquires work schedule information on a work schedule specifying a timing to be implemented of an item management work. Display screen generator 46 generates time chart 81 illustrating temporal transition of the display state of item, based on the display state information, and displays image 82 representing a timing to be implemented by superimposing the image on time chart 81. Therefore, the user can recognize the timing at which the item management work is supposed to be executed based on time chart 81, and the user compares this timing with a timing to be implemented and can easily recognize the delay situation of the item management work.

In the present exemplary embodiment, display state information storage 34 stores the detection result by item detector 32 and the determination result by display state determinator 33 as display state information, work schedule information obtainer 43 acquires work schedule information on a work schedule specifying a timing to be implemented of an item management work, work implementation status analyzer 45 acquires a required delay period up to the timing at which the item management work is supposed to be executed, from a timing to be implemented of the item management work, based on the display state information and the work schedule information, and display screen generator 46 generates time charts 81, 91 illustrating temporal transition of the display state of item, based on the display state information, and displays images 83, 93 representing a delay period by superimposing them on time charts 81, 91. Therefore, the user can easily recognize the delay situation of the item management work, based on images 83, 93 representing a delay period.

Although the present invention has been described based on a specific exemplary embodiment, these exemplary embodiments are merely examples, and the present invention is not limited by these exemplary embodiments. In addition, all the constituent elements of an item monitoring device, an item monitoring system, and an item monitoring method according to the present invention described in the above exemplary embodiments are not necessarily indispensable, and can be selected as appropriate at least without departing from the scope of the present invention.

For example, in the present exemplary embodiment, a retail store such as a convenience store has been described as an example, but the present invention is not limited to such a retail store, but can also be applied to a store of a business type other than the retail store.

In the present exemplary embodiment, as illustrated in FIG. 2, an omnidirectional camera having a photographing range of 360 degrees using a fisheye lens is used as camera 1, but a camera having a predetermined angle of view, a so-called box camera may also be used.

In the present exemplary embodiment, as illustrated in FIG. 4A to FIG. 4F, a frame image 21 representing the outline of the state monitoring area is displayed as the display state displaying image representing the display state of item in the state monitoring area, but the display state displaying image is not limited to thereto, for example, an icon representing the display state of item with a pattern or a change of color may be displayed on or near the state monitoring area, or a color bar whose length and color change depending on the display state may be displayed.

In the present exemplary embodiment, as illustrated in FIG. 14, the statistical information on the sales situation of item and the statistical information on the display state of item are displayed in time chart display portion 54 on the monitoring screen in the sales factor analysis mode, but in addition thereto, statistical information on the number of visiting customers to the store, that is, the number of visiting customers to the store per unit time (time zone) may be displayed. In this way, it can be checked whether or not an event in which a sales opportunity loss is supposed to occur, that is, an event in which a large deviation occurs between the actual sales volume and the average sales volume is due to a decrease in the number of visiting customers to the store. Statistical information on the number of customers staying in a customer stay area (the number of staying customers) before the display area (such as a display shelf) may be displayed. In this way, it is possible to more reliably recognize the situation of the sales opportunity loss. In this case, the number of customers per unit time may be acquired by counting the number of visiting customers to the store and customers staying in the customer stay area from the image of camera 1 using a known person detection technique.

In the present exemplary embodiment, as illustrated in FIG. 14, the statistical information on the sales situation of item and the statistical information on the display state of item are displayed in time chart display portion 54 on the monitoring screen in the sales factor analysis mode, but in a case where sales information which is the source of the statistical information on the sales situation of item cannot be acquired, only the statistical information on the display state of item may be displayed in time chart display portion 54.

In the present exemplary embodiment, the statistical information on the display state of item (item occupancy rate per unit time) is displayed on monitoring screen in the sales factor analysis mode as illustrated in FIG. 14, and on monitoring screen in the work situation analysis mode as illustrated in FIG. 16, but display state information which is the source of this statistical information, that is, an item occupancy rate for each time may be displayed. In the present exemplary embodiment, in FIG. 14 and FIG. 16, the time chart of an item occupancy rate is displayed as information on the display state of item, but as in the example illustrated in FIG. 10, a time chart in which the durations of the display states of item (the satisfied state, the mild shortage state, and the severe shortage state) are displayed in a color-coded manner may be displayed.

In the present exemplary embodiment, both of image 82 representing a timing to be implemented and image 83 representing a delay period are superimposed and displayed on time chart 81 on the monitoring screen in the work situation analysis mode as illustrated in FIG. 16, but only one of image 82 representing a timing to be implemented and image 83 representing a delay period may be displayed. In this way as well, it is possible to recognize the delay situation of the item management work.

In the present exemplary embodiment, image 92 representing a work schedule and image 93 representing a duration as illustrated in FIG. 18 and FIG. 19 are displayed in combination with time chart 91 in which the duration of the display state of item is displayed in a color-coded manner, on the monitoring screen in the work situation analysis mode, but image 92 representing a work schedule and image 93 representing a duration as illustrated in FIG. 18 and FIG. 19 may be displayed in combination with time chart 81 of a graph representing an item occupancy rate for each time zone as illustrated in FIG. 16.

In the present exemplary embodiment, both the display disturbance state and the display shortage state are detected as the item display state, but only one of the display disturbance state and the display shortage state may be detected.

In the present exemplary embodiment, PC 3 installed in the store may be configured to execute the processes required for the item monitoring, but as illustrated in FIG. 1, the required processes may be executed by PC 11 installed in the head office or cloud computer 15 constituting a cloud computing system. The required processes may be shared by a plurality of information processing devices, and information may be transferred between the plurality of information processing devices through a communication medium such as an IP network or a LAN. In this case, an item monitoring system is configured with the plurality of information processing devices that share required processes.

With such a configuration, a device such as PC 3 installed in the store may be configured to execute at least a process having a large amount of data, for example, an item detection process, among the processes required for item monitoring. With this configuration, since the data amount of the remaining processing can be reduced, even if the remaining processing is executed by an information processing apparatus installed at a location different from the store, for example, PC 11 installed in the head office, the communication load can be reduced, so that the operation of a system using a wide area network connection form becomes easy.

Cloud computer 15 may be configured to execute all required processes, or cloud computer 15 may be configured to share at least the screen output processing out of the required processes.

With this configuration, mobile terminal 16 such as smart phones or tablet terminals as well as PC 3 and 11 installed in the store and the head office can also display the monitoring screen, so that supervisors who are traveling through the store can monitor the display status of item at a remote store at any place such as a visiting place in addition to the store and the head office.

In the present exemplary embodiment, a description is made on the case where PC 3 installed in the store executes the processes required for the item monitoring, the monitoring screen or the like is displayed on monitor 9 connected to PC 3, and required input and output are executed in PC 3, but the required input and output may be executed in an information processing device different from the information processing apparatus that executes the processes required for the item monitoring, for example, PC 11 installed in the head office or mobile terminals 4, 16 such as smart phones or tablet terminals.

INDUSTRIAL APPLICABILITY

According to an item monitoring device, an item monitoring system, and an item monitoring method of the present invention, there is an effect that it is possible to easily check the implementation status of the item management work such as arrangement or replenishment of item, that is, whether or not a store staff member quickly and appropriately performs the item management work, and easily recognize the delay situation in a case where the item management work is delayed, and are useful as an item monitoring device, an item monitoring system, and an item monitoring method which monitor a display status of item based on a captured image of a display area in a store.

REFERENCE MARKS IN THE DRAWINGS

1 camera
2 recorder (image storage device)
3 PC (item monitoring device)
4 mobile terminal
5 sales information management device
6 store business management device
8 input device
9 monitor (display device)
11 PC
12 sales information management server (POS server)
13 store business management server
15 cloud computer
16 mobile terminal
21 frame image
22 image area
23 text area
31 image obtainer
32 item detector
33 display state determinator
34 display state information storage
35 state monitoring area setter
36 state threshold setter
37 work detector
38 caution event detector
39 alert determinator
40 alert executer
41 statistical information generator
42 sales information obtainer
43 work schedule information obtainer
44 sales opportunity loss analyzer
45 work implementation status analyzer
46 display screen generator
47 log information storage
51 operation mode selector
52 date display portion
53 date selector
54 time chart display portion
55 display time operation portion
56 image display portion
57 text display portion
58 display mode selector 59 warning icon
60 start indicator
61, 65, 71, 81, 91 time chart
62 slider
63 scroll button
72 alert mark (image representing caution point)
82 image representing timing to be implemented
83, 93 image representing delay period
92 image representing work schedule

The invention claimed is:

1. An item monitoring device which monitors a display status of item based on a captured image of a display area in a store, the item monitoring device comprising:
   a processor that
      sets a state monitoring area on the image of the display area;
      detects an item displayed in the state monitoring area, based on an item occupancy rate in each state monitoring area;
      determines a display state of item in the state monitoring area, based on the detected item displayed in the state monitoring area; and
      generates a monitoring screen including a monitoring image in which a display state displaying image representing the display state of item in the state monitoring area is superimposed on the image of the display area, based on the determined display state,
   wherein the processor calculates a proportion occupied by pixels of one or more objects corresponding to the item in the image of the display area for determining the item occupancy rate, and
   wherein the processor changes a display color of the display state displaying image depending on the display state.

2. An item monitoring device which monitors a display status of item based on a captured image of a display area in a store, the item monitoring device comprising:
   a processor that
      sets a state monitoring area on the image of the display area;
      detects an item displayed in the state monitoring area, based on an item occupancy rate in each state monitoring area;
      determines a display state of item in the state monitoring area, based on the detected item displayed in the state monitoring area; and
      generates a monitoring screen including a monitoring image in which a display state displaying image representing the display state of item in the state monitoring area is superimposed on the image of the display area, based on the determined display state,
   wherein the processor calculates a proportion occupied by pixels of one or more objects corresponding to the item in the image of the display area for determining the item occupancy rate, and
   wherein the display state displaying image is a frame image representing the state monitoring area that is set on the image of the display area.

3. The item monitoring device of claim 1, further comprising:
   a memory that stores the detected item displayed in the state monitoring area and the determined display state, as display state information,
   wherein the processor generates a time chart illustrating temporal transition of the display state of item, based on the display state information, and displays the time chart and the monitoring image on the monitoring screen.

4. The item monitoring device of claim 1, wherein the processor further
   determines propriety of a notification instructing a store staff member to perform an item management work, based on the determined display state, and
   generates the notification, based on the detected item displayed in the state monitoring area,
   wherein the processor calculates a determination on at least one of a display disturbance state and a display shortage state, as the display state, and
   wherein the processor generates a notification instructing a store staff member to perform at least any one of an arranging work to resolve a disturbance in display, and a replenishing work to resolve shortage of item, as the item management work.

5. The item monitoring device of claim 1,
   wherein the processor causes to display a character representing the display state of item on the monitoring screen, in a state corresponding to the state monitoring area of the monitoring image, based on the determined display state.

6. The item monitoring device of claim 1, wherein the processor further:
   executes a process for detecting a caution event which needs to urge caution to a user regarding the display state of item, based on the determined display state, and
   wherein the processor causes to display a message display portion indicating the contents of the caution event, based on the detected caution event.

7. The item monitoring device of claim 1, further comprising:
   a memory that stores the detected item displayed in the state monitoring area and the determined display state, as display state information;
   wherein the processor further
   acquires sales information on a sales situation of item in a store;
   executes a statistical process on the sales information with time to generate statistical information on the sales situation of item;
   acquires a caution point at which a sales opportunity loss is expected to occur, based on the statistical information; and
   generates a time chart illustrating temporal transition of the display state and the sales situation of item, based on the display state information and the statistical information, and causes to display a caution image representing a caution point by superimposing the caution image on the time chart.

8. The item monitoring device of claim 1, further comprising:
   a memory that stores the detected item displayed in the state monitoring area and the determined display state, as display state information,
   wherein the processor further
   acquires work schedule information on a work schedule specifying a timing to be implemented of an item management work, and
   generates a time chart illustrating temporal transition of the display state of item, based on the display state information, and causes to display a timing image representing a timing to be implemented by superimposing the timing image on the time chart.

9. The item monitoring device of claim 1, further comprising:
a memory that stores the detected item displayed in the state monitoring area and the determined display state, as display state information,
wherein the processor further
acquires work schedule information on a work schedule specifying a timing to be implemented of an item management work,
acquires a delay period required up to the timing at which the item management work is supposed to be executed, from a timing to be implemented of the item management work, based on the display state information and the work schedule information, and
generates a time chart illustrating temporal transition of the display state of item, based on the display state information, and causes to display a delay image representing a delay period by superimposing the delay image on the time chart.

10. An item monitoring system which monitors a display status of item based on a captured image of a display area in a store, the item monitoring system comprising:
a camera that captures an image of the display area; and
a plurality of information processing devices,
wherein any one of the plurality of information processing devices includes
a processor that
sets a state monitoring area on the image of the display area;
detects an item displayed in the state monitoring area, based on an item occupancy rate in each state monitoring area;
determines a display state of item in the state monitoring area, based on the detected item displayed in the state monitoring area; and
generates a monitoring screen including a monitoring image in which a display state displaying image representing the display state of item in the state monitoring area is superimposed on the image of the display area, based on the determined display state,
wherein the processor calculates a proportion occupied by pixels of one or more objects corresponding to the item in the image of the display area for determining the item occupancy rate, and
wherein the processor changes a display color of the display state displaying image depending on the display state.

11. An item monitoring method causing an information processing device to implement a process of monitoring a display status of item based on a captured image of a display area in a store, the item monitoring method comprising:
setting, by a processor, a state monitoring area on the image of the display area,
detecting, by the processor, an item displayed in the state monitoring area, based on an item occupancy rate in each state monitoring area;
determining, by the processor, a display state of item in the state monitoring area, based on the detected item displayed in the state monitoring area; and
generating, by the processor, a monitoring screen including a monitoring image in which a display state displaying image representing the display state of item in the state monitoring area is superimposed on the image of the display area, based on the determined display state,
wherein the processor calculates a proportion occupied by pixels of one or more objects corresponding to the item in the image of the display area for determining the item occupancy rate, and
wherein the processor changes a display color of the display state displaying image depending on the display state.

12. The item monitoring device of claim 1, wherein the item occupancy rate is further based on a number of the item included in the image of the display area.

13. The item monitoring device of claim 1, wherein the processor configured to calculate the proportion by comparing pixels of background image which is captured when item does not exist on the monitoring area to pixels of one or more objects corresponding to the item in the image of the display area.

* * * * *